US009779628B2

(12) United States Patent
Yamashiro

(10) Patent No.: US 9,779,628 B2
(45) Date of Patent: Oct. 3, 2017

(54) CONVOY TRAVEL SYSTEM AND CONVOY TRAVEL APPARATUS

(71) Applicant: DENSO CORPORATION, Kariya, Aichi-pref. (JP)

(72) Inventor: Takahisa Yamashiro, Chiryu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 177 days.

(21) Appl. No.: 14/050,849

(22) Filed: Oct. 10, 2013

(65) Prior Publication Data

US 2014/0107867 A1 Apr. 17, 2014

(30) Foreign Application Priority Data

Oct. 11, 2012 (JP) .................... 2012-226186

(51) Int. Cl.
| | |
|---|---|
| G08G 1/00 | (2006.01) |
| G08G 1/16 | (2006.01) |
| G05D 1/02 | (2006.01) |
| B62D 15/02 | (2006.01) |
| B60W 40/06 | (2012.01) |

(52) U.S. Cl.
CPC .............. *G08G 1/22* (2013.01); *B60W 40/06* (2013.01); *B62D 15/0255* (2013.01); *G05D 1/0274* (2013.01); *G05D 1/0293* (2013.01); *G08G 1/167* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 2010/0134320 A1* | 6/2010 | Chevion et al. | 340/932 |
| 2010/0256852 A1* | 10/2010 | Mudalige | 701/24 |

FOREIGN PATENT DOCUMENTS

| | | |
|---|---|---|
| JP | 11-328584 | 11/1999 |
| JP | 11328584 A | * 11/1999 |

OTHER PUBLICATIONS

Office Action dated Jan. 19, 2016 issued in the corresponding JP application No. 2012-226186 in Japanese with English translation.

* cited by examiner

*Primary Examiner* — Todd Melton
*Assistant Examiner* — Jason Roberson
(74) *Attorney, Agent, or Firm* — Harness, Dickey & Pierce, P.L.C.

(57) ABSTRACT

A convoy travel apparatus for organizing a convoy of vehicles is provided. The convoy travel apparatus controls at least one of the convoy of vehicles to change lanes to a lane that is opposite to a merging lane when it is determined that the convoy of vehicles approaches a merge point of a multi-lane road and a currently traveling lane of the convoy of vehicles has the merge point. In such a lane change scheme, a vehicle having no communication device may merge into the multi-lane road without compromising a ride comfort of the convoy of vehicles.

18 Claims, 14 Drawing Sheets

(LEFT-HAND TRAFFIC IN JAPAN IS ASSUMED)

CONVOY TRAVEL SYSTEM AND CONVOY TRAVEL APPARATUS

CROSS-REFERENCE TO RELATED APPLICATION

The present application is based on and claims the benefit of priority of Japanese Patent Application No. 2012-226186 filed on Oct. 11, 2012, the disclosure of which is incorporated herein by reference.

TECHNICAL FIELD

The present disclosure generally relates to a convoy travel system and a convoy travel apparatus for organizing a convoy of vehicles.

BACKGROUND

Conventionally, a convoy travel technique is known for organizing a convoy of vehicles, in which information is transmitted from vehicle to vehicle through vehicle-to-vehicle communication from a leader vehicle to its following vehicles, for the control of the following vehicles. That is, the following vehicles are controlled to follow the leader vehicle of a convoy by transmitted information from the leader vehicle, thereby making up a group of vehicles traveling as a convoy.

Further, in a patent document 1 (i.e., Japanese Patent Laid-Open No. H11-328584), a vehicle group formation apparatus is disclosed, which splits a convoy of vehicles into two portions to allow a merging vehicle to merge into traffic. When the convoy of vehicles reaches a merge point of the road (i.e., at a part of a road where an on-ramp merges with a main road), the convoy of vehicles is split into a former portion and a latter portion to accommodate the merging vehicle within a gap created between the former portion and the latter portion. More specifically, when the convoy of vehicles approaches the merge point, the vehicle group formation apparatus identifies a convoy vehicle that will "meet" the merging vehicle at the merge point (i.e., a convoy vehicle that reaches the merge point substantially at the same time as the merging vehicle) based on position information that is transmitted directly or indirectly from the merging vehicle. Then, the vehicle group formation apparatus performs a deceleration control for the identified convoy vehicle and other subsequent vehicles (i.e., the latter portion of the convoy of vehicles), to create a gap within the convoy of vehicles such that the merging vehicle may merge into traffic by entering into the gap.

However, the technique in the patent document 1 is problematic, because the technique assumes that all vehicles are equipped with a wireless communicator and capable of transmitting position information. Therefore, vehicles not equipped with a communicator are ignored and the merging of such a non-communicator equipped vehicle at the merge point may be hindered.

Further, the reserving of the gap and the merging of the vehicle within the gap at the merge point may always be allowed by splitting the convoy into two portions (i.e., former/latter groups of convoy vehicles). However, if the merging vehicle does not enter into the gap, splitting of the convoy and deceleration of the latter convoy vehicles is unnecessary. That is, in other words, an unnecessary speed change occurs and the ride comfort of the latter convoy vehicles is compromised.

SUMMARY

It is an object of the present disclosure to provide a convoy travel system and a convoy travel apparatus for performing a control that enables a merging vehicle that is not equipped with a communicator to merge into a convoy at a merge point of a road while preventing an unnecessary speed change for convoy vehicles, such that a ride comfort of the convoy vehicles is not deteriorated.

The present disclosure provides a convoy travel system for organizing a convoy having a plurality of self vehicles that are each respectively equipped with a convoy travel apparatus that includes a follow travel controller for controlling the self vehicle to respectively follow a preceding vehicle by using information obtained from the preceding vehicle through communication. The follow travel controller of the convoy travel system in each of the plurality of self vehicles has a travel lane identification unit for identifying a travel lane of the convoy and a pre-merge determination unit for determining whether the convoy is approaching a merge point of a multi-lane road that has multiple travel lanes on a side of traffic. The follow travel controller of the convoy travel system also has a lane change unit for performing a steering control of the plurality of self vehicles to change lanes, such that when (i) the pre-merge determination unit determines that the convoy approaches the merge point and (ii) the travel lane identification unit identifies that the convoy travels in a travel lane that has the merge point, the lane change unit controls at least one of the plurality of self vehicles in the convoy to change lanes toward a no-merge lane that is opposite to a merging lane.

In such manner, when it is determined that the convoy approaches the merge point, a portion of the convoy is controlled to change lanes toward a no-merge lane, which is opposite to the merging lane relative to the mergee lane, thereby enabling the apparatus to reserve a merge space for the merging vehicle even when no information is transmitted from the merging vehicle. Therefore, even when the merging vehicle is not equipped with a wireless communicator, the merging of the merging vehicle at the merge point will not be hindered.

Further, since only a portion of the convoy moves to reserve the merge space, that is, not all convoy vehicles are controlled to change lanes, such reservation of the merge space is more efficiently enabled in comparison to a reservation of the merge space by convoy splitting (i.e., by acceleration/deceleration of a portion of the convoy vehicles). In other words, a lateral movement of a vehicle (i.e., changing lanes) requires less energy than accelerating/decelerating the vehicle. Therefore, even when the merging vehicle does not enter into the merge space, unnecessary acceleration/deceleration is prevented and the ride comfort of plural convoy vehicles is not compromised.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

Embodiments of the present disclosure are described with reference to the drawings in the following.

(First Embodiment)

Figure 1A:
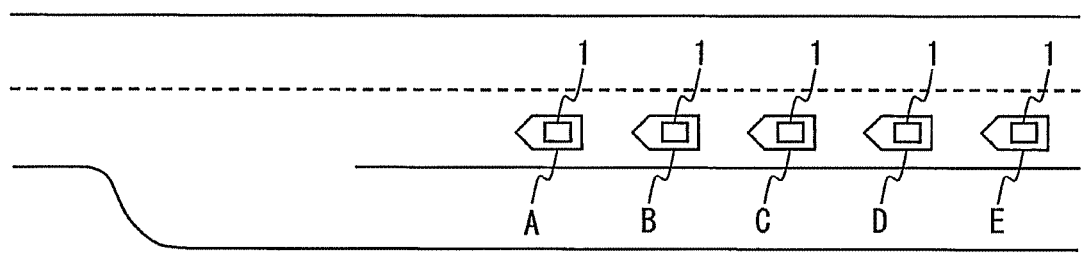
FIG. 1A is an illustration of a schematic configuration of a convoy travel system.

FIG. 1A is a block diagram of a schematic configuration of a convoy travel system 100 to which the present disclosure is applied. The convoy travel system 100 in FIG. 1A includes five convoy vehicles, each having the convoy travel apparatuses 1 installed (i.e., the convoy travel apparatuses 1 installed on vehicles A to E).

Further, the configuration of the convoy travel system 100 may include any number of convoy vehicles, which have the convoy travel apparatus 1 installed. However, in the following example, the system 100 is described with five apparatuses 1 respectively installed on vehicles A to E.

Figure 1B:
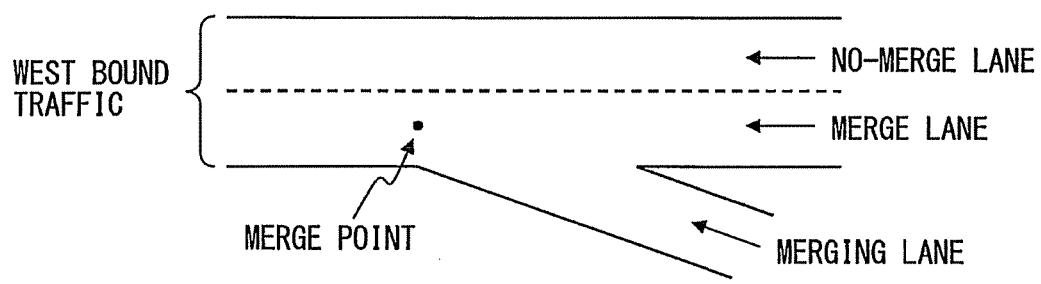
FIG. 1B is an illustration of a multi-lane road that includes a merging lane, a merge lane, a no-merge lane, and a merge point.

FIG. 1B is an illustration of a left-hand traffic multi-lane road which may be found in countries such as Japan. The multi-lane road may include, for example, a merging lane, a merge lane, and a no-merge lane. The merging lane may be an on-ramp to allow vehicles to merge into the mergee lane. The merging lane and the mergee lane are next to each other. The no-merge lane is on a side of the mergee lane opposite to the merging lane. The multi-lane road includes a merge point where the merging lane (i.e., on-ramp) merges with mergee lane.

Figure 2:
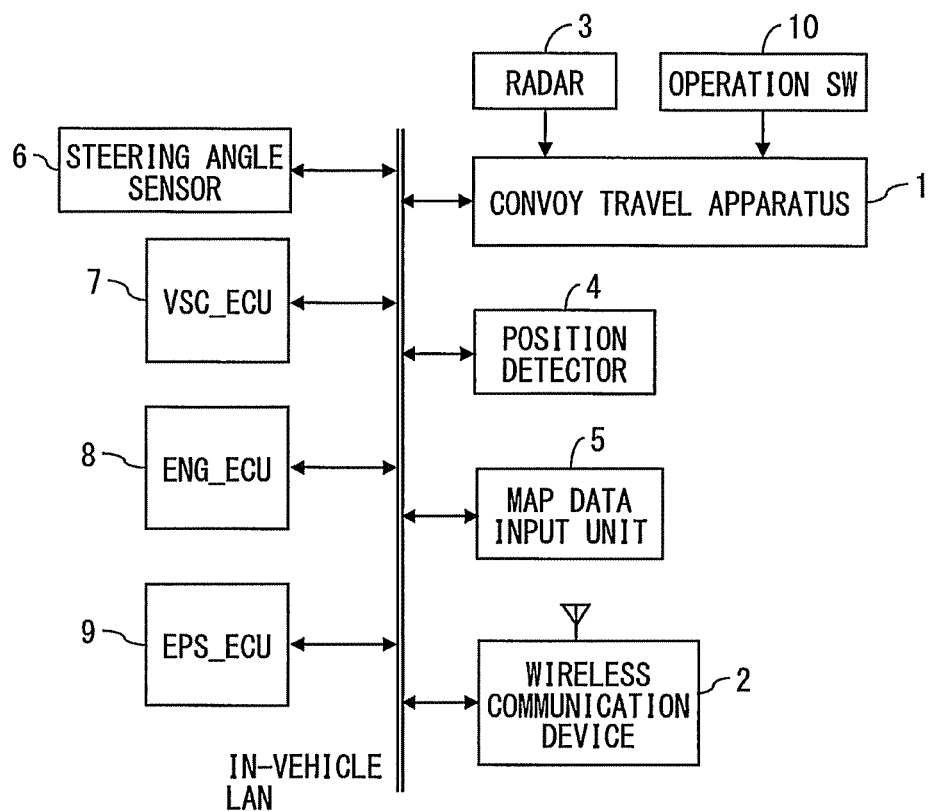
FIG. 2 is a block diagram of a schematic configuration of a convoy travel apparatus.

Now, with reference to FIG. 2, the schematic configuration of the convoy travel apparatus 1 is described. The convoy travel apparatus 1 is connected to the following components, for the exchange of electronic information. That is, the apparatus 1 is capable of exchanging information with a wireless communication device 2, a radar 3, a position detector 4, a map data input unit 5, a steering angle sensor 6, a VSC_ECU 7, an ENG_ECU 8, an EPS_ECU 9 and an operation switch 10, as shown in FIG. 1A. More practically, the convoy travel apparatus 1 may be connected to the wireless communication device 2, the position detector 4, the map data input unit 5, the steering angle sensor 6, the VSC_ECU 7, the ENG_ECU 8, the EPS_ECU 9, through an in-vehicle LAN that has a standardized protocol such as CAN (i.e., Controller Area Network) or the like.

The wireless communication device 2 is a vehicle-to-vehicle communication unit that performs a short distance wireless communication in a frequency band of 700 MHz, 5.8 GHz or the like. More practically, the wireless communication device 2 performs, for example, a broadcast communication with other vehicles, in which a destination of the communication (e.g., a destination vehicle of the vehicle-to-vehicle communication) is not specified/identified.

The radar 3 emits an electromagnetic wave toward a front field of the self vehicle, and detects a reflection wave from the front field, for scanning a predetermined range around the self vehicle. The emission control for emitting the electromagnetic wave is performed by the convoy travel apparatus 1, and a detection signal that indicates that a reflection wave is detected is supplied for the convoy travel apparatus 1. For example, the radar 3 may be a millimeter wave radar, a laser radar or the like. The radar 3 can thus detect a distance to an object vehicle in the front field of the self vehicle, (i.e., in the predetermined range from the self vehicle), as well as a relative speed of the object vehicle relative to the self vehicle.

The position detector 4 is capable of detecting and determining a current position of the self vehicle on demand or at predetermined intervals, based on information from various sensors, which may be, for example, a geomagnetism sensor detecting geomagnetism, a gyroscope detecting an angular speed around a vertical axis of the self vehicle, a range sensor detecting a travel distance of the self vehicle, and a Global Positioning System (GPS) for detecting a current position of the self vehicle by using a signal from GPS satellites.

Further, the position detector 4 detects, on demand or at predetermined intervals, a travel direction of the self vehicle by using the geomagnetism sensor and/or the gyroscope. The travel direction of the self vehicle may be determined based on a straight line that connects a few latest current positions of the self vehicle which is calculated by a least square method based on position coordinates of those current positions, assuming that such straight line represents the travel direction of the self vehicle. In the following description of the present embodiment, it is assumed that the travel direction of the self vehicle is detected and determined by the geomagnetism sensor and/or the gyroscope of the position detector 4, on demand or at predetermined interval.

Further, depending on the detection accuracy of those sensors, the position detector 4 may include only some of the above sensors, or, may include additional sensors in addition to the above sensors. Further, for example, the current positions of the self vehicle and other vehicle(s) are represented by using a longitude and a latitude, and the travel direction is described as a bearing angle measured from the north.

The map data input unit 5 is a device to input map data to a storage medium (not illustrated) in the unit 5. Link data and node data representing a road are included in the map data. The link data also includes the number of the traffic lanes and a speed limit value of the represented road, as well as other attributes such as a road type, a road width and the like. The node data representing a node, at which two or more roads intersect, merge, or branch with each other, is made up from a unique node ID, node coordinates, a node name, connecting link IDs of connecting links, an intersection type and the like.

The steering angle sensor 6 is a sensor for detecting a steering angle of the self vehicle. The VSC_ECU 7 controls a VSC function (i.e., Vehicle Stability Control, a registered trademark) for controlling a sideway slip of the vehicle by controlling a brake actuator (not illustrated) which applies a braking force to the vehicle. The VSC_ECU 7 receives information about a requested deceleration from the in-vehicle LAN, and controls the brake actuator for generating the request deceleration of the vehicle. Further, the VSC_ECU 7 transmits a vehicle speed and a brake pressure to the in-vehicle LAN.

The ENG_ECU 8 receives information about a requested acceleration from the in-vehicle LAN, and controls a throttle actuator (not illustrated) for generating the requested acceleration of the vehicle. Further, when receiving information about the requested deceleration, it controls the throttle actuator for generating an engine braking. The EPS_ECU 9 controls a steering angle by operating an EPS actuator. The operation switch 10 is a group of switches which are operable by the driver of the self vehicle, and operation information of the group of switches is output to the convoy travel apparatus 1.

The convoy travel apparatus 1 is implemented, together with other parts, as a microcomputer, and includes a CPU, a ROM, a RAM, an input/output and a bus for connecting such electronic components. The convoy travel apparatus 1 performs various processes based on information of various kinds which are input from the wireless communication device 2, the radar 3, the position detector 4, the map data input unit 5, the steering angle sensor 6, the VSC_ECU 7, the ENG_ECU 8 and the EPS_ECU 9.

The convoy travel apparatus 1 performs a vehicle information transmission process. A flow of a vehicle information transmission process is described with reference to a flowchart in FIG. 3. The vehicle information transmission process is repeatedly performed at predetermined intervals of every 100 milliseconds or the like.

First, in step S1, the process determines a current position of the self vehicle, and proceeds to step S2. The determination of the current position of the self vehicle is performed by obtaining such position from the position detector 4. Further, for such determination, a detection signal of the position detector 4 may be obtained, and the current position of the self vehicle may be determined by the convoy travel apparatus 1 based on such detection signal.

In step S2, the process generates position related information, and proceeds to step S3. The position related information includes the current position that is determined in step S1. Further, the position related information includes an in-convoy position ranking of the self vehicle (i.e., a position/ranking of the self vehicle according to an order of the vehicles in the convoy and relative to other vehicles within the convoy), which represents the number of vehicles from a leader vehicle to the self vehicle in a self convoy, whenever such order has already been determined. The in-convoy position ranking may refer to a leader vehicle (i.e., a front-most vehicle) or a tail vehicle (i.e., a rear-most vehicle) of the convoy, for determining a vehicle position ranking of the self vehicle in the convoy. That is, the in-convoy position ranking of the self vehicle may be relative to the front-most or rear-most vehicle of the convoy.

In step S3, the process generates vehicle information, and proceeds to step S4. The vehicle information at least includes, in addition to the position related information determined in step S2, identification information to identify the self vehicle, a vehicle speed of the self vehicle, and a travel direction of the self vehicle.

The vehicle speed of the self vehicle is obtained from the VSC_ECU 7, and the travel direction of the self vehicle is obtained from the position detector 4. The identification information may be, for example, a vehicle ID of the self vehicle or a device ID of the wireless communication device 2, or the like. In the present embodiment, the device ID is used as the identification information in the following description. Further, the device ID of the wireless communication device 2 is obtained from, for example, a memory of the ROM of the communication device 2.

Further, the vehicle information includes other attributes such as an inter-vehicle distance to a front vehicle that exists in front of the self vehicle (e.g., in a predetermined range in front of the self vehicle) detected by the radar 3 (designated as a radar inter-vehicle distance hereinafter), a travel lane of the self vehicle on the road, a steering angle of the self vehicle, a signal from an accelerator switch and/or a brake switch, a connection request signal for a preceding vehicle (i.e., a signal from the self vehicle, inquiring of a vehicle in front about whether the self vehicle can join the convoy), and a reply signal as a reply for the connection inquiry.

The travel lane of the self vehicle may be obtained (i.e., a travel lane identification process) in the following manner, for example. That is, when it is available, a highly accurate GPS signal may be received by the position detector 4, and the current position of the self vehicle based on the GPS positioning is obtained therefrom, which is then combined with the link data from the map data input unit 5, for accurately determining the travel lane of the self vehicle by the convoy travel apparatus 1.

Alternatively, a front camera (not illustrated) such as a fish-eye lens camera may be employed for capturing a front image of the self vehicle, including an image of the front road, and such a front image is analyzed by the convoy travel apparatus 1 for determining/estimating the travel lane of the self vehicle. Further, the travel lane of the self vehicle may also be determined by the convoy travel apparatus 1 based on such estimation by the image analysis in combination with the position information and the travel direction of the self vehicle from the position detector 4 and the link data from the map data input unit 5.

Furthermore, if the wireless communication device 2 includes a device that communicates with a roadside device such as a road beacon or the like for obtaining information through a road-to-vehicle communication, the information from such roadside device may be obtained by the communication device 2 for determining the travel lane of the self vehicle.

When the vehicle information is transmitted, the vehicle information may be configured to include time information such as a time stamp indicative of a detection time of the vehicle information. The time in the time stamp may be derived from a GPS time, which is based on an atomic clock of the satellite in the satellite positioning system.

In step S4, the process transmits (i.e., broadcasts) the vehicle information generated in step S3 from the wireless communication device 2, and finishes the flow of the process itself.

Figure 3:
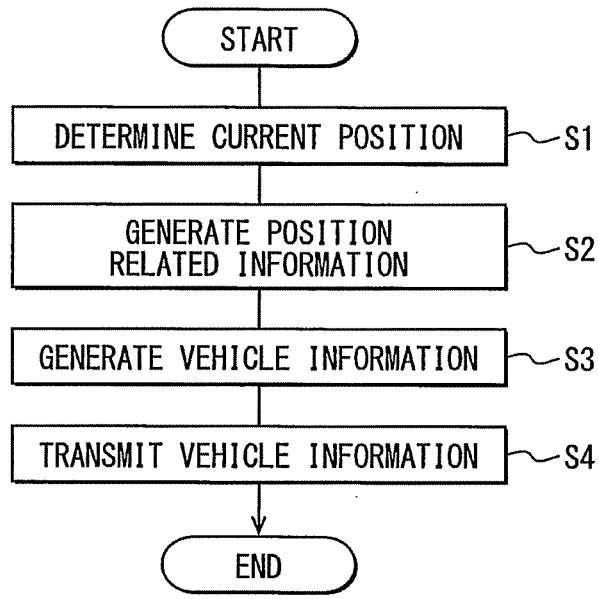
FIG. 3 is a flowchart of a vehicle information transmission process by the convoy travel apparatus.

The convoy travel apparatus 1 in the self vehicle obtains the vehicle information of the other vehicle through the wireless communication device 2 of the self vehicle by performing a process of FIG. 3, when the vehicle information of the other vehicle is generated in advance by the convoy travel apparatus 1 in the other vehicle and is transmitted by the wireless communication device 2 in the other vehicle. The convoy travel apparatus 1 stores the vehicle information from the other vehicle in a memory such as a RAM.

The convoy travel apparatus 1 erases the vehicle information that has been stored for a predetermined time or more, and overwrites the old vehicle information with the newly-obtained vehicle information having the same device ID. The newly-obtained (i.e., new) vehicle information is stored in the memory when the device ID of the new vehicle information is different from the device ID of the old vehicle information.

The predetermined time described above may be an amount of time that is arbitrarily set, such as a few seconds or the like. In such manner, only the latest vehicle information from the vehicles around the self vehicle, which are in condition of periodically performing the vehicle-to-vehicle information, is stored in the memory of the self vehicle.

Further, the convoy travel apparatus 1 uses various components that are connected by the in-vehicle LAN for performing a follow travel control. Therefore, the convoy travel apparatus 1 is equivalent to a "follow travel controller" in the claims. In the present embodiment, after turning a main switch of a cruise control switch to an ON state, which is the operation SW 10, the follow travel control may start at a turning ON timing of a control start switch of the cruise control switch, and the follow travel control may end at a turning ON timing of a control end switch of the cruise control switch.

The follow travel control starts after an identification of a preceding vehicle that is communicable through vehicle-to-vehicle communication and that serves as an object of a follow travel control, that is, an object vehicle to be followed or a "followee" vehicle. The preceding vehicle may thus be designated as a followee vehicle in some cases. The identification of the followee vehicle is achieved by performing a followee vehicle identification process, which is described in the following.

In the followee vehicle identification process, the followee vehicle is identified based on the following comparison, that is, the comparison between (i) a preceding vehicle that is detected based on a signal from the radar 3 of the self vehicle and (ii) a sender vehicle that has transmitted the vehicle information received by the self vehicle through the vehicle-to-vehicle communication. More practically, when the preceding vehicle and the sender vehicle are similar, in terms of the speed and the distance relative to the self vehicle as well as a relative position therefrom, such preceding vehicle is determined as a followee vehicle.

An inter-vehicle distance between the self vehicle and the sender vehicle in the vehicle information, which has been received by the self vehicle through the vehicle-to-vehicle communication from the sender vehicle, can be calculated based on a distance between the position coordinates of the current position regarding the self vehicle and the sender vehicle, which may be designated as an inter-position distance. More practically, an inter-position distance between the two positions of the respective vehicles is calculated in the first place, and, by deducting an offset distance of the position detector 4 in the self vehicle from an edge of the self vehicle from the above-described inter-position distance, an inter-vehicle distance may accurately be calculated. If a position of the position detector 4 in the self vehicle is a center of the self vehicle, the inter-vehicle distance between the two vehicles (Dinter-v) is represented in the following manner.

(Equation 1)

$$D_{inter\text{-}v} = \text{an inter-position distance} - (\text{a vehicle length of the self vehicle} + \text{a vehicle length of the sender vehicle})/2$$

The follow travel control may be implemented as a vehicle control, in which the inter-vehicle distance from the self vehicle toward the preceding vehicle is controlled to have a target distance. In the convoy travel system 100, each of the plural vehicles except for a "leader" (i.e., the vehicle A) of a convoy follows the preceding vehicle by performing the above-described follow travel control by using the convoy travel apparatus 1 in each of the plural in-convoy vehicles. As a result, a convoy travel by the plural vehicles A to E is organized, which makes a convoy of those vehicles.

Figure 4:
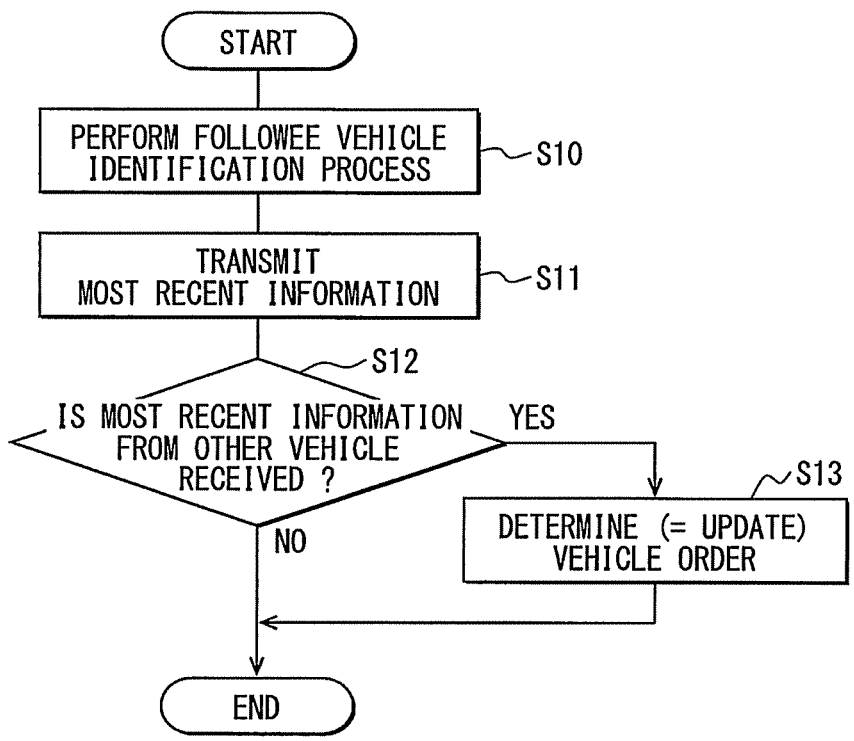
FIG. 4 is a flowchart of an order determination process by the convoy travel apparatus.

Further, the convoy travel apparatus 1 performs a vehicle order determination process. A flow of the vehicle order determination process is described with reference to a flowchart in FIG. 4. The vehicle order determination indicates a determination of an order of many in-convoy vehicles, that is, which one of in-convoy vehicles is a preceding vehicle and which one of those vehicles is a succeeding vehicle (i.e., a follower). The vehicle order determination process is repeatedly performed at predetermined intervals.

First, in step S10, the process performs the above-described followee vehicle identification process, and proceeds to step S11. In step S11, the process transmits most recent information by a broadcast method from the wireless communication device 2. The most recent information is the information including the device ID of the preceding vehicle that is identified by the followee vehicle identification process, the device ID of the self vehicle and information of an order of those vehicles. Further, the most recent information may be configured to be transmitted by the vehicle information transmission process, that is, the vehicle information transmitted by such process may include the most recent information.

In step S12, the process determines whether the most recent information from the other vehicle has been received. Then, the process proceeds to step S13, when it has determined that it received the most recent information from the other vehicle (step S12, YES). On the other hand, the process finishes a flow when it has determined that it did not receive the most recent information from the other vehicle (step S12, NO).

In step S13, the process uses the most recent information just received and the most recent information having already been received from the other vehicle(s), for the determination of the vehicle order in a currently traveling lane of the self vehicle. The most recent information that has already been received from the other vehicle(s) is retrieved from the memory for the above use, which is stored therein as the vehicle information. When the vehicle order has already been determined, such a vehicle order is updated.

For example, when two pieces of most recent information have been received by the self vehicle, a first piece includes information of the device ID "#124" of the sender vehicle transmitting the most recent information (i.e., the first piece), and also includes information of the device ID "#31" of the preceding vehicle of the sender vehicle. The other piece (i.e., a second piece) includes information of the device ID "#91" of the sender vehicle transmitting the most recent information (i.e., the second piece), and also includes information of the device ID "#124" of the preceding vehicle of the sender vehicle.

By using the device ID "#124" that is found in both of the two pieces of information as a key, the two pieces of information can be combined. As a result, the vehicle order of "#91" to "#124" to "#31" is determined. In the above example, two pieces of information are combined. However, by combining three or more pieces of most recent information, the vehicle order of four or more vehicles can also be determined for a convoy of vehicles in one-dimensional series of vehicle arrangement/formation.

By determining a vehicle order in the above-described manner, a preceding vehicle of the self vehicle as well as a following vehicle that follows the self vehicle are determined. Further, by determining the vehicle order in the above-described manner based on the device ID of the preceding/following vehicle, the convoy travel apparatus 1 in the self vehicle is enabled to recognize that certain information is obtained from the preceding/following vehicle. Then, by transmitting information about the vehicle order in the self convoy through the vehicle-to-vehicle communication directly or indirectly between vehicles, the convoy travel apparatus 1 in each of the in-convoy vehicles can recognize the number of vehicles in the self convoy, for example.

Further, the convoy travel apparatus 1 performs a merge point approach time process. An example of a flow of the merge point approach time process in the first embodiment is described with reference to a flowchart in FIG. 5. The merge point approach time process may be performed, for example, when it is determined that (i) the self vehicle is traveling in a convoy, and (ii) the self convoy is approaching a merge point of a road that has multiple lanes on one side of traffic. The merge point may be limited to a point of an on-ramp of a toll road or an expressway.

Whether the self vehicle is in a convoy or not may be determined, for example, based on whether the self vehicle is performing a follow travel control. Further, whether the self vehicle is approaching a merge point of a multi-lane road may be determined, for example, using map data from the map data input unit 5 and data from the position detector 4 regarding a position of the self vehicle and a travel direction of the self vehicle.

A situation that the self vehicle is approaching a merge point of a multi-lane road may be determined when (i) the position of the self vehicle is determined on a merging link, which is one of two links that are connected to a merge point node and is associated with traffic that is merging with main traffic and (ii) a distance between the current position of the self vehicle and the position of the merge point is equal to or under a certain threshold. Therefore, the convoy travel apparatus 1 is equivalent to a "pre-merge determination unit" in the claims.

First, in step S20, the process performs a travel lane identification process to identify a travel lane in which the self convoy is currently traveling. The travel lane identification process identifies the currently traveling lane of the self vehicle as previously described. The travel lane identification process recognizes a currently traveling lane of the self vehicle as a currently traveling lane of the self convoy. Therefore, the process in step S20 is equivalent to a "travel lane identification unit" in the claims.

In step S21, the process determines whether the currently traveling lane has the merge point and is adjacent to the merging lane that is merging with a main road. In other words, as illustrated in FIG. 1B, the merging lane and the mergee lane, which is a left-most lane in left-hand traffic countries such as Japan, are next to each other. When it is determined that the travel lane of the self convoy is the left-most lane of the main road, the travel lane is determined as the mergee lane. When, on the other hand, it is determined that the travel lane of the self convoy is not the left-most lane of the main road, the travel lane is not determined as the mergee lane. In right-hand traffic countries such as United States of America, the left-most lane in the above description should be changed to the right-most lane.

Then, the process proceeds to step S22 when it is determined that the travel lane of the self convoy is the mergee lane (step S21, YES). On the other hand, the process proceeds to step S31 when it is determined that the travel lane of the self convoy is not the mergee lane (step S21, NO).

In step S22, the process performs a vacancy determination process, and proceeds to step S23. The vacancy determination process determines whether each of all in-convoy vehicles has a vacant space in the no-merge lane, which is on an opposite side relative to the merging lane. The vacant space is more practically defined as a space on an adjacent lane extending from a diagonal-front of the each vehicle toward a side of each vehicle, into which each vehicle can move by changing lanes.

The vacancy determination process may determine, for example, that the vacancy is available based on a detection result of the radar 3, which detects whether any vehicle exists at a diagonal-right front or a diagonal-left front of the self vehicle. The detection result of the diagonal-left/right front vehicle may be transmitted in the vehicle information to the other vehicle. Further, the convoy travel apparatus 1 receiving the above-described detection result of other vehicles may transmit the received detection result to the other vehicles in addition to the detection result of the self vehicle by incorporating the information in the vehicle information transmitted therefrom. In such manner, all in-convoy vehicles in the self convoy can obtain and share the detection result.

Further, when the radar 3 in each vehicle can detect a lateral vehicle, that is, a vehicle on a right side within a certain range of the self vehicle or a vehicle on a left side within a certain range of the self vehicle, the above-described determination may be performed based on the detection result of the lateral vehicle.

In step S23, the process performs a lane-changing vehicle determination process, and proceeds to step S24. In the lane-changing vehicle determination process, the process determines, according to a predetermined condition, that a part of the vehicles in the self convoy (i.e., at least one of the vehicles in the self convoy) should change lanes (i.e., a lane-change object vehicle, hereinafter). The predetermined condition may be, for example, that a vehicle is determined as having a vacancy in the vacancy determination process. Therefore, the process in the above-described step S22 is equivalent to a "vacancy determination unit" in the claims.

In the present embodiment, the process determines or designates only one vehicle in the self convoy as the lane-change object vehicle. The predetermined condition may preferably be, for example, defined that such lane-change object vehicle is not a leader of the self convoy and is not a rear-most vehicle that is at a very end of the self convoy. Further, the predetermined condition may further be defined that such lane-change object vehicle has a vehicle position ranking (i.e., a vehicle position/ranking according to an order of the vehicles in the convoy and relative to other vehicles within the convoy) of at least in a middle of the self convoy or a subsequent to it.

For example, when the self convoy has five vehicles A to E, such lane-change object vehicle may be a vehicle C, which is in a middle, and a vehicle D, excluding a vehicle E at a very end of the convoy. Then, if only one of the vehicles C and D has a vacancy, a vehicle having the vacancy is determined as the lane-change object vehicle. Further, an additional condition in addition to the above may further be defined that such lane-change object vehicle is a vehicle that is closest to a tail-end vehicle of the convoy (i.e., a rear-most vehicle of the convoy). In case that the self convoy has four vehicles A to D, such lane-change object vehicle is the vehicle C only, which is, among subsequent-to-middle vehicles, not a rear-most vehicle of the self convoy.

Further, in the present embodiment, only one vehicle is determined as a lane-change object vehicle. However, as long as a part of the in-convoy vehicles (i.e., at least one of the vehicles of the in-convoy) are determined as lane-change object vehicles, the number of the lane-change object vehicle may be more than one.

For example, two in-series vehicles may be determined as the lane-change object vehicles (i.e., a modification example 1). In such case, from among vehicles having vacancy, vehicles that are not a convoy leader (i.e., front-most vehicle) and are not a tail vehicle (i.e., rear-most vehicle) while being closest to a tail vehicle vehicle of the convoy may be determined as the lane-change object vehicles.

Further, all vehicles that are subsequent to a vehicle having a predetermined position ranking in the convoy (i.e., a predetermined position/ranking according to an order of the vehicles in the convoy and relative to other vehicles within the convoy) may be determined as the lane-change object vehicles (i.e., a modification example 2). In such case, the predetermined position ranking in the convoy may be, for example, a position/ranking that is subsequent to a middle position/ranking of the convoy while being closest to the middle position/ranking (e.g., an fifth vehicle in a seven vehicle convoy, or a fourth vehicle in a six vehicle convoy).

Furthermore, the lane-change object vehicles may be every other vehicle in the convoy, starting from the second vehicle in the convoy, or every other vehicle in the convoy, starting from the first vehicle in the convoy (i.e., a modification example 3).

In step S24, when the self vehicle falls in a category of the lane-change object vehicle of the lane-changing vehicle determination process (step S24, YES), the process proceeds to step S25. On the other hand, the process proceeds to step S28 when the self vehicle does not fall in the category of the lane-change object vehicle of the lane-changing vehicle determination process (step S24, NO).

In step S25, the process performs a lane change process, and proceeds to step S26. The lane change process instructs the EPS_ECU 9 to perform a steering control of the self vehicle so that the self vehicle can change lanes to a no-merge lane that is opposite to the merging lane.

An example of the lane change process may be performed, for example, such that the self vehicle changes lanes under a steering control in a feedback manner, in which a lateral movement of the self vehicle is controlled to have a target movement amount based on a camera-captured image supplied for the convoy travel apparatus 1 which enables an extraction and a detection of the lateral movement of the self vehicle relative to a position of the adjacent lane.

Further, the lane change process may also be performed according to a target lateral movement of the self vehicle, which is derived from the travel lane of the self vehicle and the road width of the adjacent lane that are calculated based on the road width in a link data that is input from the map data input unit 5 and the position of the self vehicle from the position detector 4. That is, by moving the self vehicle by the target lateral movement amount, the travel lane of the self vehicle may be moved to the adjacent lane. Furthermore, the lane change of the self vehicle may be performed by other methods.

When the self vehicle is controlled to change lanes, it is desirable not to change the vehicle speed, that is, to minimize acceleration/deceleration of the self vehicle, by sending instructions to the VSC_ECU 7 and the ENG_ECU 8.

In step S26, the process performs a post-lane-change follow process, and proceeds to step S27. The vehicles in the self convoy are controlled in the following manner by the post-lane-change follow process. That is, when the preceding vehicle of the self vehicle before the lane change is now in a different lane, the post-lane-change follow process switches a "normal" follow travel control of the self vehicle to follow a same-lane preceding vehicle to an other-lane follow travel control that controls the self vehicle to follow a preceding vehicle in a different lane that is different from the travel lane of the self vehicle. The other-lane follow travel control is equivalent to a "first other lane follow travel control" in the claims.

The other-lane follow travel control is performed based on the coordinates of the current position of the preceding vehicle included in the vehicle information that is received through vehicle-to-vehicle communication from the preceding vehicle. That is, for example, an inter-position distance between the current position of the self vehicle and the current position of the preceding vehicle is calculated from the position coordinates of those vehicle positions, and an inter-vehicle distance is than calculated from such inter-position distance in the same manner as the followee vehicle identification process described above. Then, by using a trigonometric function, the above-calculated inter-vehicle distance is converted to a "true" value that corrects an error due to an offset of two vehicles in a vehicle width direction. Then, based on an after-conversion inter-vehicle distance, the vehicle behavior of the self vehicle is controlled to have a target inter-vehicle distance of a normal follow travel control. The travel lane of the self vehicle is maintained by performing a lane-keeping assist control.

Further, in case that the preceding vehicle of the self vehicle has also changed lanes, that is, when the preceding vehicle before the lane change of the self vehicle is still a preceding vehicle after the lane change of the self vehicle, the self vehicle follows such preceding vehicle by continuing a normal follow travel control in the post-lane-change follow process.

Figure 6A:
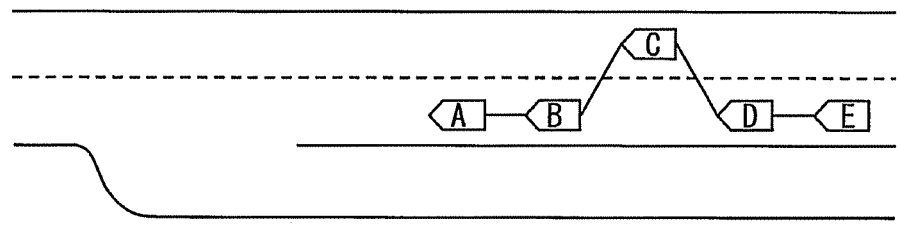
FIGS. 6A to 6D are illustrations of a convoy state after performing a lane change process and a post-lane-change follow process.

A state of the convoy after both of the lane change process and the post-lane-change follow process is described with reference to FIG. 6A to FIG. 6D. When only one vehicle is considered as the lane-change object vehicle as described above, the convoy is maintained in a state in which only one vehicle is traveling in a different lane after the lane change as shown in FIG. 6A.

Figure 6B:
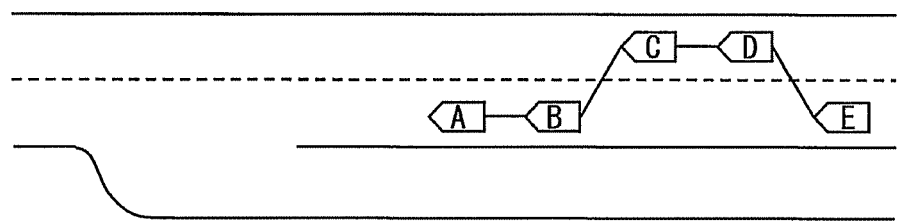

When two in-series vehicles are considered as the lane-change object vehicles in the self convoy as described in the modification example 1, the convoy is maintained in a state in which the two in-series vehicles are traveling in a different lane after the lane change as shown in FIG. 6B.

Figure 6C:
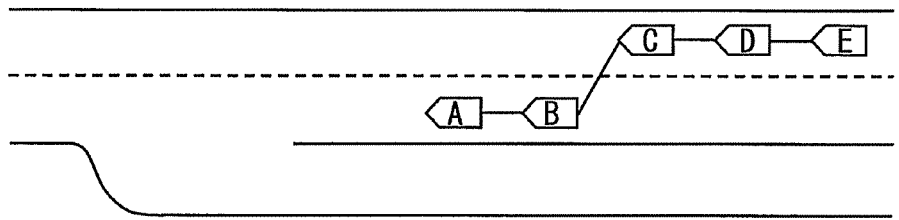

When all vehicles subsequent to a vehicle having a predetermined position ranking are considered as the lane-change object vehicles in the self convoy as described in the modification example 2, the convoy is maintained in a state in which the vehicles subsequent to the vehicle having the predetermined position ranking are traveling in a different lane after the lane change as shown in FIG. 6C.

Figure 6D:
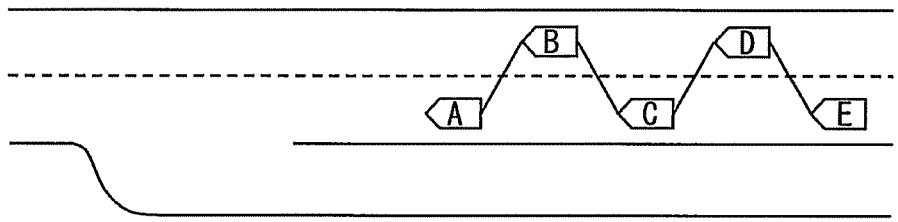

When all vehicles subsequent to a vehicle having a predetermined position ranking are considered as the lane-change object vehicles in the self convoy as described in the modification example 3, the convoy is maintained in a state in which every other vehicles are traveling in a different lane after the lane change as shown in FIG. 6D.

In those illustrations in FIG. 6A to FIG. 6D, solid lines extending from vehicles A to D indicate that a follow travel control to follow a preceding vehicle is maintained by each of the following vehicles.

Figure 5:
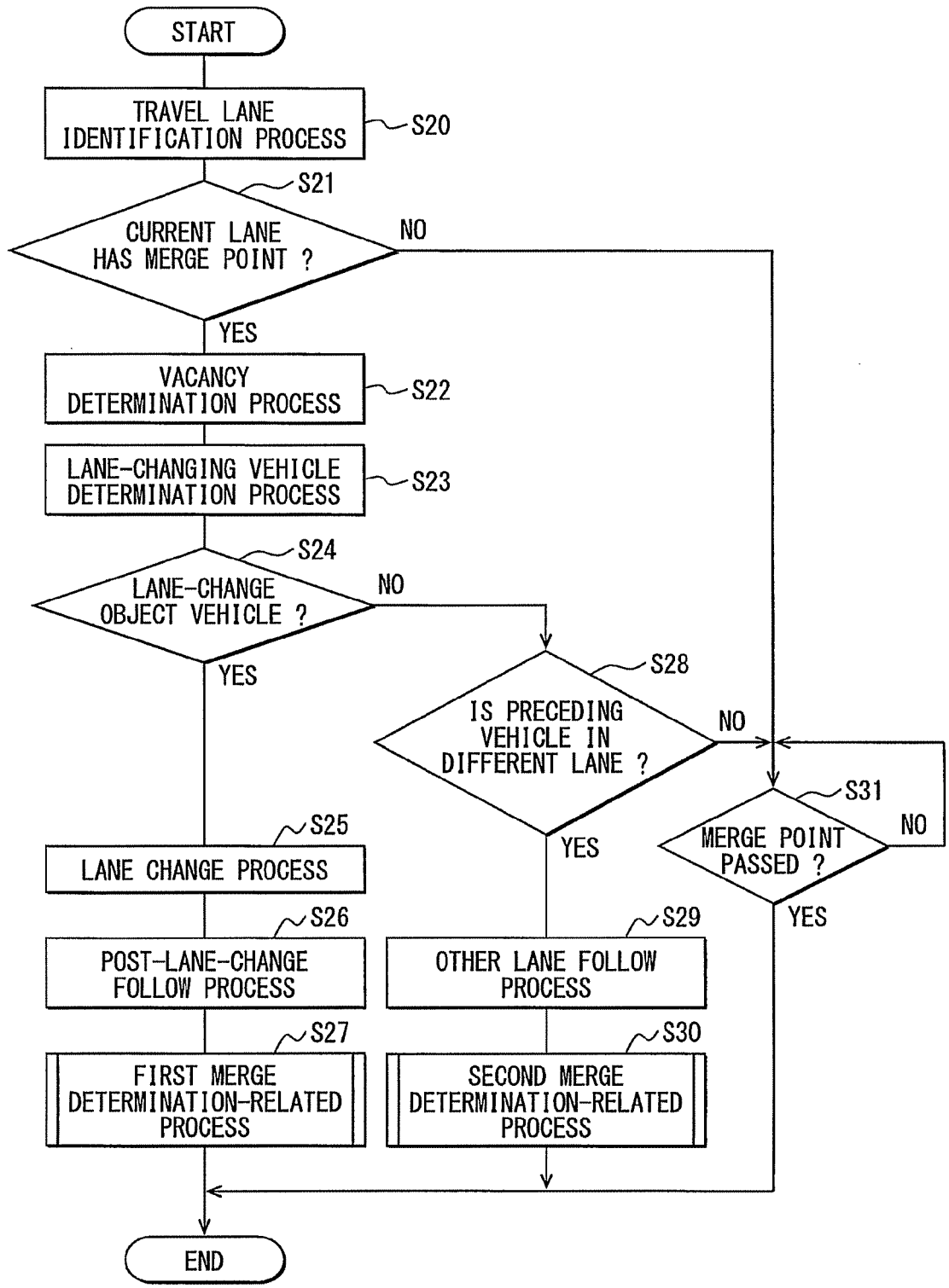
FIG. 5 is a flowchart of a merge point approach time process by the convoy travel apparatus in a first embodiment.
Figure 7:
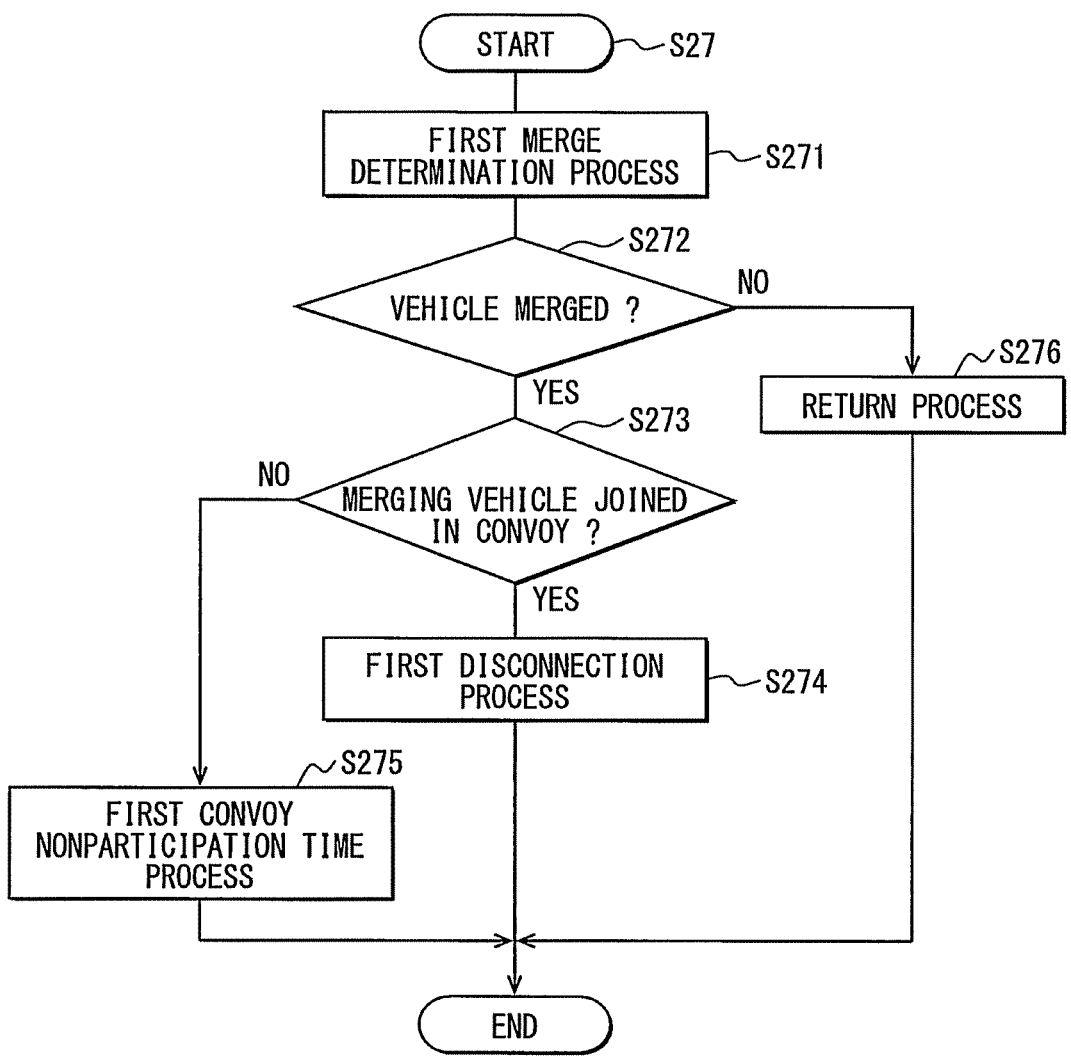
FIG. 7 is a flowchart of a first merge determination-related process.

In step S27 of FIG. 5, the process performs a first merge determination-related process, and then the process ends. The first merge determination-related process is described in the following with reference to a flowchart in FIG. 7.

First, the process performs a first merge determination process in step S271, and proceeds to step S272. The first merge determination process determines whether a merging vehicle has merged in a lane on a merging point side of the self vehicle. The process in S271 is equivalent to a "merge determination unit" in the claims.

For example, when a new vehicle is detected as traveling in front of a pre-lane-change following vehicle based on the vehicle information received from the pre-lane-change following vehicle which includes a detection result of the radar 3 that detects a preceding vehicle, it may be determined that a merging vehicle has merged. The first merge determination process may be configured to be performed after the current position of the self vehicle (i.e., the position coordinate of the self vehicle) exceeds the position coordinate of the merge point by a predetermined distance (e.g., a few hundred meters) or more.

In step S272, the process branches to step S273 when the first merging determination process determines that the merging vehicle exists (step S272, YES). On the other hand, the process branches to step S276 when the first merging determination process determines that the merging vehicle does not exist (step S272, NO).

In step S273, the process determines whether the merging vehicle has joined the convoy. For example, when the self vehicle receives the most recent information from the other vehicle (i.e., the merging vehicle, through vehicle-to-vehicle communication in which a vehicle that was the preceding vehicle of the self vehicle before lane change is designated as the preceding vehicle of the merging vehicle) it is determined that the merging vehicle has joined the convoy. When, on the other hand, the above-described most recent information has not been received from the merging vehicle before a lapse of a predetermined time, it may be determined that the merging vehicle has not joined the convoy.

Then, the process proceeds to step S274 when it is determined that the merging vehicle joined the convoy (step S273, YES). On the other hand, the process proceeds to step S275 when it is determined that the merging vehicle has not joined the convoy (step S273, NO).

In step S274, the process performs a first disconnection process, and finishes the flow. The first disconnection process finishes a follow travel control for finishing a connection to (i.e., a follow travel control to follow) a preceding vehicle, which separates the self vehicle from the convoy, regardless of the type of the follow travel control (i.e., for both cases of performing the normal follow travel control and the other-lane follow travel control).

A state of the convoy leading to the first disconnection the first disconnection process is described with reference to FIG. 8A to FIG. 8D. In the following, the self vehicle is described as the vehicle C, and the merging vehicle is described as a vehicle F.

Figure 8A:
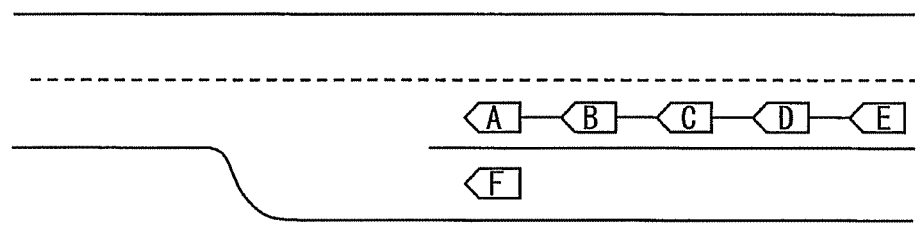
FIGS. 8A to 8D are illustrations of a series of convoy state transitions leading to a first disconnection process.
Figure 8B:
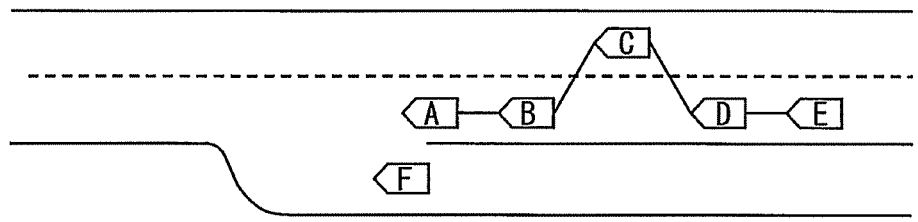
Figure 8C:
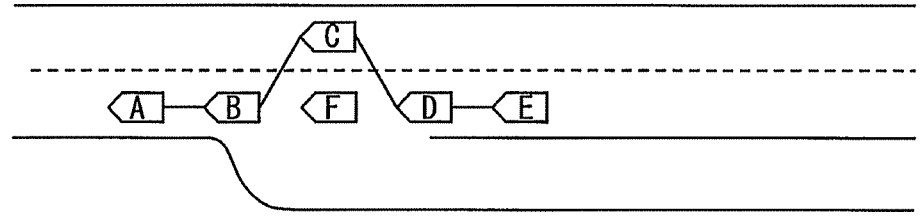
Figure 8D:
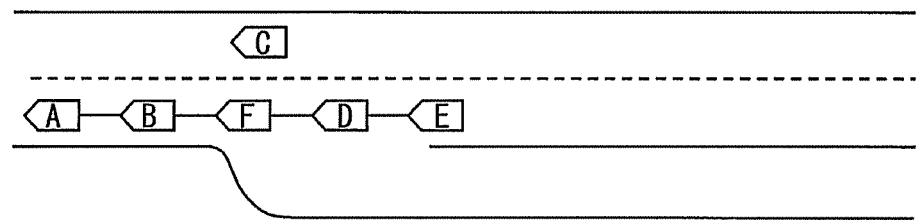

First, before starting the merge point approach time process, all vehicles A to D in the convoy travel in the same lane (see FIG. 8A). When a lane change is performed after the start of the merge point approach time process, only the vehicle C changes lanes to a different lane, with a follow travel to follow the vehicle B kept unchanged (see FIG. 8B). Further, as described in detail later, the vehicle D maintains a follow travel to follow the vehicle C even though the vehicle D travels in a different lane from a travel lane of the vehicle C. Then, the merging vehicle F merges (see FIG. 8C), and if the merging vehicle F has joined the convoy, the first disconnection process is performed, and the vehicle C leaves the convoy.

Figure 9A:
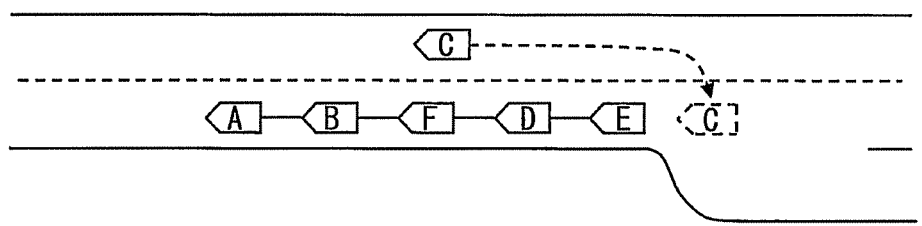
FIGS. 9A and 9B are illustrations of a fourth modification of the first embodiment.
Figure 9B:
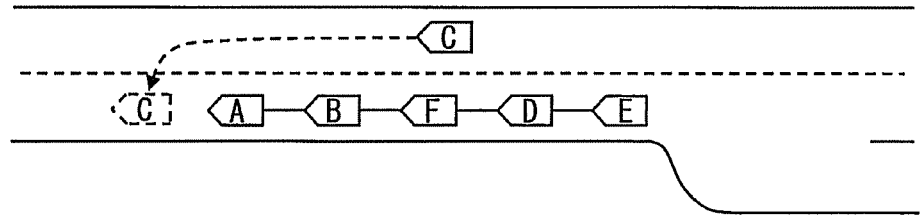

Further, a merge and leave scheme in the present embodiment, in which the merging vehicle F on the side of the self vehicle joining the convoy leads to a leave of the self vehicle from the convoy, may perform other functions. That is, for example, after the merging of the merging vehicle F on the side of the self vehicle into the convoy, the convoy travel apparatus 1 may automatically perform, for the self vehicle, acceleration/deceleration control and steering control, for moving the self vehicle either to a front of a leader of the convoy (FIG. 9B), or on a back of a very end vehicle (i.e., a tail vehicle) of the convoy (FIG. 9A), which is a modification example 4 of the present embodiment. The convoy travel apparatus 1 is thus equivalent to a "behavior control unit" in the claims.

When adopting the above-described modification example 4, the lane change of the self vehicle may be performed according to the lane change process described above, and the acceleration/deceleration of the self vehicle may be performed by sending instructions to the VSC_ECU 7 or to the ENG_ECU 8. The position in front of the convoy leader or the position behind a tail vehicle may be determined based on the vehicle information that is received through vehicle-to-vehicle communication.

Returning to FIG. 7, the process in step S275 performs a first convoy nonparticipation time process, and finishes the flow. The first convoy nonparticipation time process determines whether the merging vehicle F, which has not joined the convoy, gets close to a preceding vehicle that precedes the self vehicle before the lane change of the self vehicle (i.e., a pre-lane-change preceding vehicle) or to the pre-lane-change following vehicle, and the contents of the first convoy nonparticipation time process are changed according to such determination.

Closeness of the merging vehicle F may be determined by the convoy travel apparatus 1 based on whether an inter-vehicle distance of the merging vehicle to the pre-lane-change preceding/following vehicle has decreased, relative to a target inter-vehicle in the normal follow travel control. The inter-vehicle distance between the vehicle F and the pre-lane-change following vehicle may be obtained as a radar inter-vehicle distance that is detected by and transmitted from the pre-lane-change following vehicle.

Further, the inter-vehicle distance between the vehicle F and the pre-lane-change preceding vehicle may be calculated based on, for example, (i) a radar inter-vehicle distance that is detected by and transmitted from the pre-lane-change following vehicle, (ii) a position coordinate of the current position of the pre-lane-change following vehicle, (iii) a position coordinate of a current position of a pre-lane-change preceding vehicle transmitted therefrom, and (iv) an average vehicle length. More practically, by deducting the radar inter-vehicle distance and the average vehicle length from an inter-position distance between the current positions of the pre-lane-change preceding/following vehicles, the inter-vehicle distance between the vehicle F and the pre-lane-change preceding vehicle is calculated.

Figure 10A:
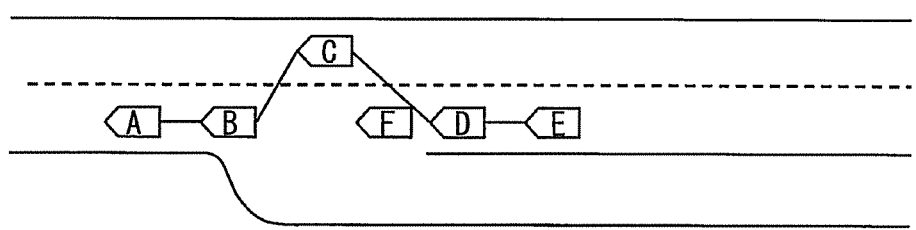
FIGS. 10A to 10C are illustrations of a first convoy nonparticipation time process.
Figure 10B:
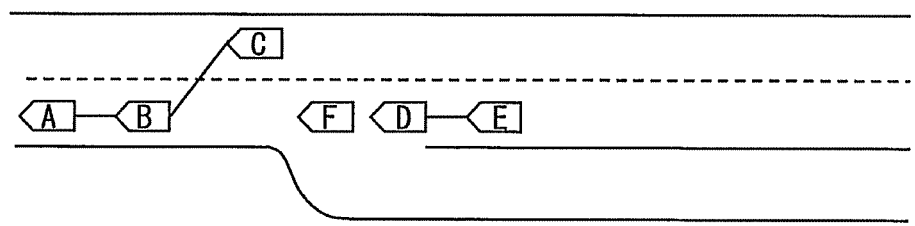
Figure 10C:
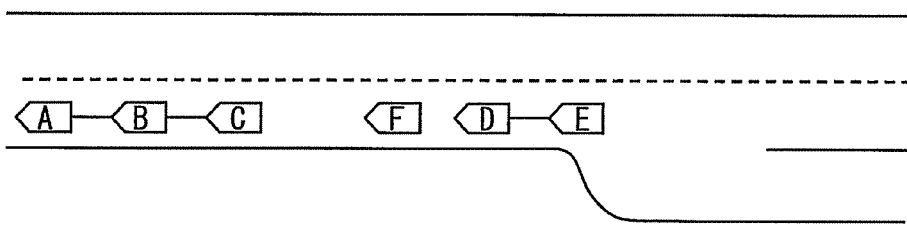

In the first convoy nonparticipation time process, when it is determined that the merging vehicle F gets close to the pre-lane-change following vehicle (see FIG. 10A), the self vehicle maintains the other-lane follow travel control to follow the pre-lane-changing preceding vehicle (see FIG. 10B). Then, after reserving a sufficient space for the lane change of the self vehicle between the pre-lane-changing preceding vehicle and the merging vehicle F, the self vehicle changes lanes to follow (i.e., to enter the same lane as) the pre-lane-changing preceding vehicle (see FIG. 10C). The lane change in such case is performed according to the lane change process described above.

Figure 11A:
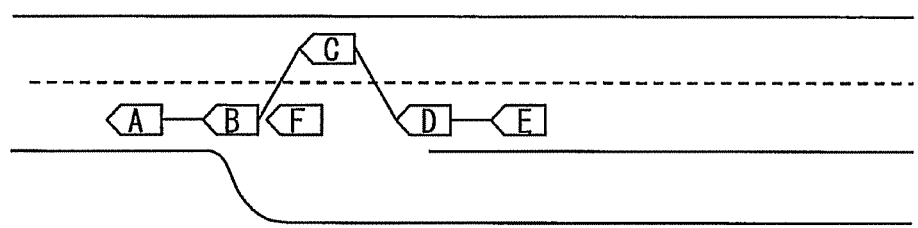
FIGS. 11A to 11C are illustrations of a second convoy nonparticipation time process.
Figure 11B:
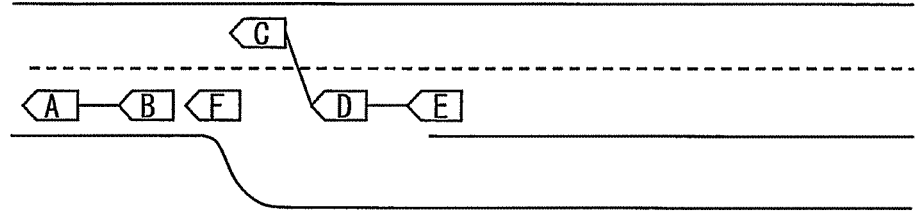
Figure 11C:
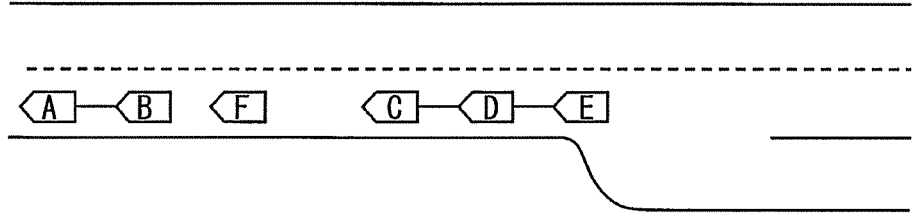

Further, in the first convoy nonparticipation time process, when it is determined that the merging vehicle F gets close to the pre-lane-change preceding vehicle (see FIG. 11A), the self vehicle finishes the other-lane follow travel control to follow the pre-lane-changing preceding vehicle (see FIG. 11B). Then, after reserving a sufficient space for the lane change of the self vehicle between the pre-lane-changing following vehicle and the merging vehicle F, the self vehicle changes lanes to return to the original lane (i.e., return to a lane where the vehicle C was traveling before changing lanes) (see FIG. 11C). The lane change in such case is performed according to the lane change process described above.

Returning to FIG. 7, the process in step S276 performs a return process, and finishes the flow. The return process is performed to return to the original lane where the self vehicle was traveling before changing lanes. Such returning to the original lane is performed according to the lane change process described above.

Now, with reference to FIG. 12A to FIG. 12D, a transition of convoy states leading to the return process is described. The self vehicle is designated as the vehicle C in the illustration.

Figure 12A:
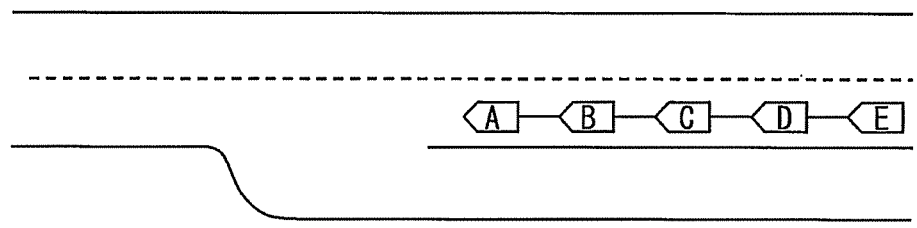
FIGS. 12A to 12D are illustrations of a series of convoy state transitions leading to a return process.
Figure 12B:
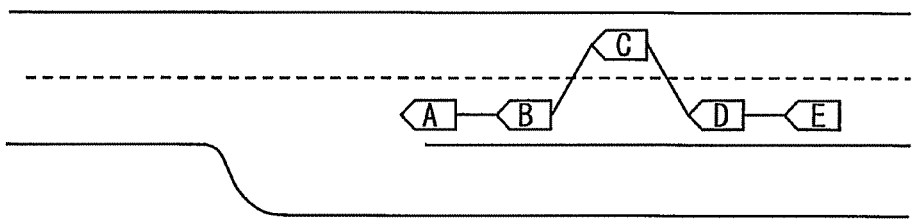

First, before starting the merge point approach time process, the vehicles A to D in the convoy travel in the same lane (see FIG. 12A). After the lane change due to the start of the merge point approach time process, only the vehicle C changes lanes to a different lane, with its follow travel to follow the vehicle B kept unchanged (see FIG. 12B). Further, the vehicle D maintains a follow travel to follow the vehicle C while traveling in a different lane. Then, after passing the merge point, the return process is performed and the vehicle C returns to the original travel lane before the lane change when the merging vehicle F has not joined the convoy (see FIG. 12C), which returns the convoy state to a pre-start state of the merge point approach time process.

Returning to FIG. 5, the process in step S28 which branches from step S24 in which it is determined that the self vehicle does not fall in a category of the lane-change object vehicle, it is determined whether the preceding vehicle is controlled to travel in a different lane from a travel lane of the self vehicle. For example, when no preceding vehicle is detected by the radar 3 of the self vehicle, it may be determined that the preceding vehicle is controlled to travel in a different lane from the self vehicle. On the other hand, if a preceding vehicle is detected by the radar 3 of the self vehicle, it may be determined that the preceding vehicle is not controlled to travel in a different lane from the self vehicle.

A preceding vehicle in this case indicates a preceding vehicle in the self convoy, and does not indicate a vehicle outside of the self convoy. Whether a vehicle is in the self convoy or not may be determined based on the most recent information among the received vehicle information that has been received through vehicle-to-vehicle communication.

That is, when the most recent information indicates that the information is in regards to a vehicle in the self convoy, it is determined that such vehicle is in the self convoy.

When it is determined that a preceding vehicle is controlled to travel in a different lane from the self vehicle (step S28, YES), the process proceeds to step S29. On the other hand, the process proceeds to step S31 when it is determined that a preceding vehicle is not controlled to travel in a different lane from the self vehicle (step S28, NO).

In step S29, the process performs an other lane follow process, and proceeds to step S30. In the other lane follow process, the follow travel control is switched from the normal follow travel control to the other lane follow travel control described above. The other lane follow travel control in this case is equivalent to a "second other lane follow travel control" in the claims.

Figure 13:
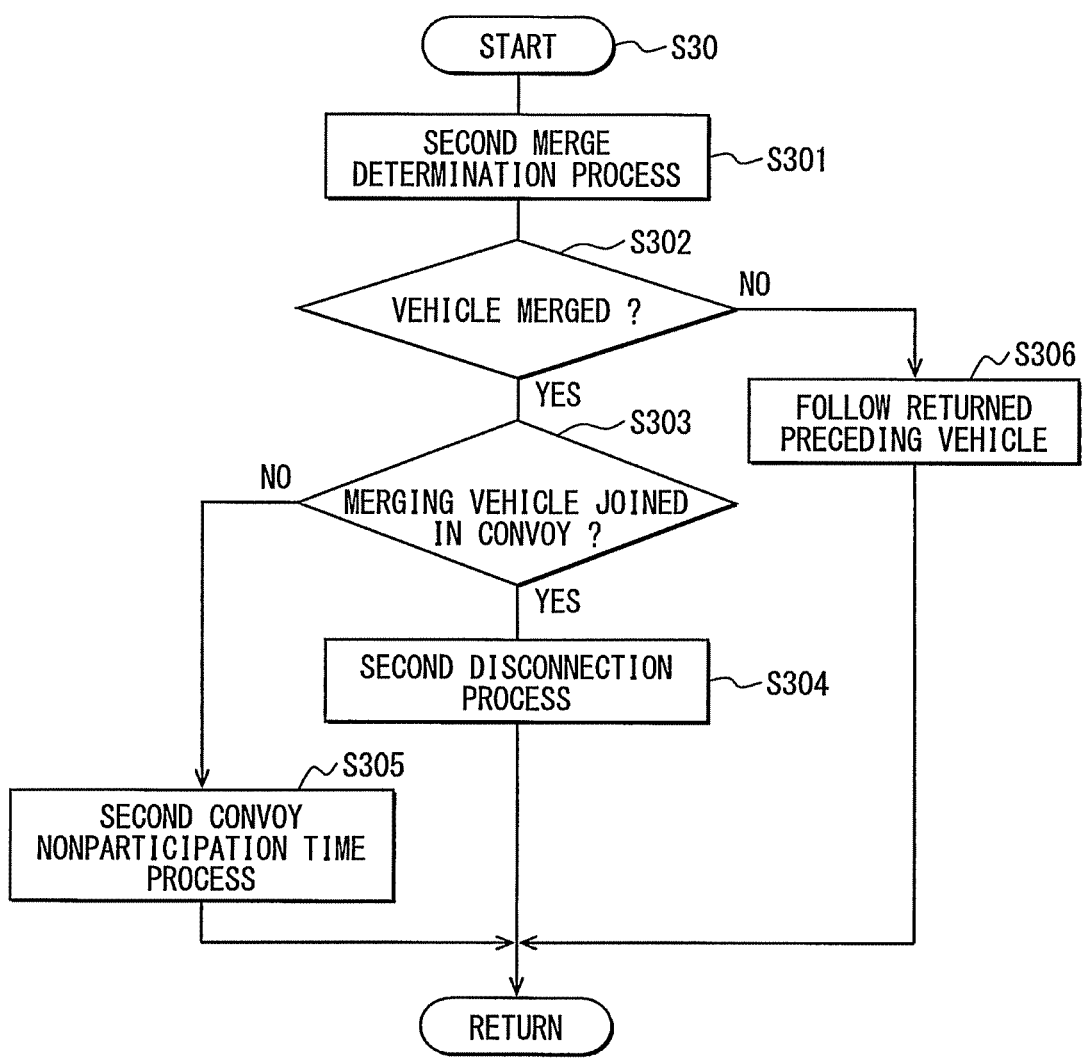
FIG. 13 is a flowchart of a second merge determination-related process.

In step S30, the process performs a second merge determination-related process, and finishes the flow. The second merge determination-related process is described in the following with reference to a flowchart in FIG. 13.

First, in step S301, the process performs a second merge determination process, and proceeds to step S302. The second merge determination process determines whether the merging vehicle F has merged in front of the self vehicle. For example, when a preceding vehicle is detected by the radar 3 of the self vehicle, it may be determined that the merging vehicle F has merged in front of the self vehicle, and, when the preceding vehicle is not detected by the radar 3 of the self vehicle, it may be determined that the merging vehicle F has not merged in front of the self vehicle. The second merge determination process may be configured to be performed after the current position of the self vehicle (i.e., the position coordinate of the self vehicle) exceeds the position coordinate of the merge point by a predetermined distance (e.g., a few hundred meters).

When it is determined in step S302 by the second merge determination process that the merging vehicle F has merged (step S302, YES), the process proceeds to step S303. On the other hand, when it is determined by the second merge determination process that the merging vehicle F has not merged (step S302, NO), the process proceeds to step S306.

It is then determined in step S303 whether the merging vehicle F has joined the convoy. For example, when the self vehicle has received the above-described most recent information, which designates, as a current preceding vehicle, a certain vehicle that was traveling before the preceding vehicle of the self vehicle (i.e., a two-step in-front vehicle), through vehicle-to-vehicle communication from the other vehicle that is a vehicle other than the one that is followed by the other-lane follow travel control (i.e., the vehicle F), it may be determined that the merging vehicle F has joined the convoy. When, on the other hand, the above-described most recent information has not been received from the merging vehicle before a lapse of a predetermined time, it may be determined that the merging vehicle has not joined the convoy.

When it is determined that the merging vehicle F has joined the convoy (step S303, YES), the process proceeds to step S304. On the other hand, when it is determined that the merging vehicle F has not joined the convoy (step S303, NO), the process proceeds to step S305.

In step S304, the process performs a second disconnection process, and finishes the flow. The second disconnection process finishes the other-lane follow travel control for finishing a connection to (i.e., a follow travel control to follow) a vehicle that is an object vehicle to be followed by the other-lane follow travel control. Then, the process starts to perform the normal follow travel control for controlling the merging vehicle F (see FIG. 8C and FIG. 8D). Further, the second disconnection process may be configured not to start the normal follow travel control for the merging vehicle F, for leaving the vehicle F as a non-convoy vehicle.

In step S305, the process performs a second convoy nonparticipation time process, and then the process ends. The second convoy nonparticipation time process determines whether the merging vehicle F, which has not joined the convoy, gets close to the self vehicle, and the contents of the second convoy nonparticipation time process are changed according to such determination. Closeness of the merging vehicle F may be determined based on whether a radar inter-vehicle distance of the preceding vehicle (i.e., the merging vehicle F) has decreased from a target inter-vehicle distance in the normal follow travel control by a predetermined value or more.

In the second convoy nonparticipation time process, when it is determined that the merging vehicle F gets close to the self vehicle (see FIG. 10A), the process finishes the other-lane follow travel control, and finishes a connection to (i.e., a follow travel control to follow) a vehicle that is an object vehicle to be followed by the other-lane follow travel control (see FIG. 10B).

Further, when it is determined that the merging vehicle F does not get close to the self vehicle (see FIG. 11A), that is, when it is determined that the merging vehicle F is not close to the self vehicle, the second convoy nonparticipation time process maintains the other-lane follow travel control (see FIG. 11B). Further, when the vehicle that is an object vehicle of the other-lane follow travel control has changed lanes to travel in the same lane as the self vehicle, the other-lane follow travel control is switched to the normal follow travel control, for performing a follow travel control (see FIG. 11C).

Figure 12C:
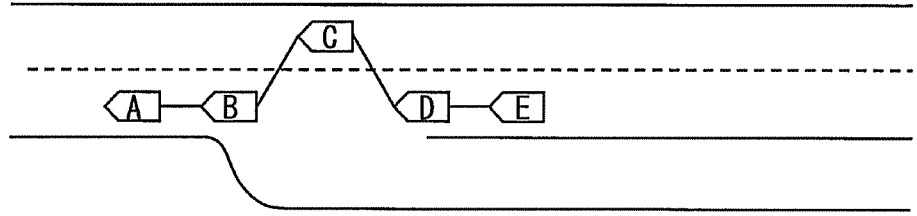
Figure 12D:
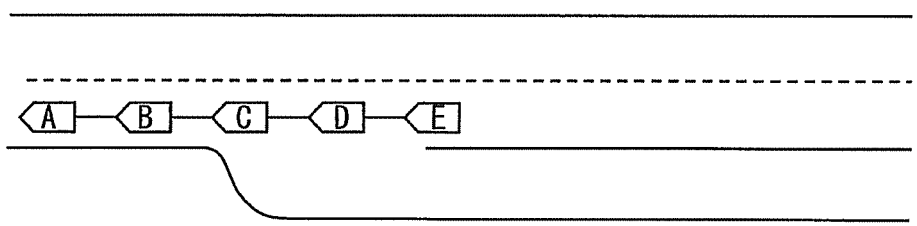

In step S306, which branches from a NO in step S303 determining that the merging vehicle F has not joined the convoy, the process performs a follow travel control by switching the other-lane follow travel control to the normal follow travel control, when the vehicle that is an object vehicle of the other-lane follow travel control has changed lanes to return to traveling in the same lane as the self vehicle (see FIG. 12C and FIG. 12D).

Returning to FIG. 5, the process in step S31 determines whether the self vehicle has passed the merge point. For example, when the position coordinate of the current position of the self vehicle exceeds the position coordinate of the merge point by a predetermined distance (e.g., a few hundred meters) or more, it may be determined that the self vehicle has passed the merge point. When it is determined that the self vehicle has passed the merge point (step S31, YES), the process finishes the flow. On the other hand, the process repeats the flow in step S31 when it is determined that the self vehicle has not passed the merge point (step S31, NO).

According to the configuration of the first embodiment, when it is determined that the convoy has approached the merge point, only one vehicle in the convoy changes lanes to an opposite lane that is opposite to the merging lane/vehicle, thereby reserving a merge space that can accommodate the merging vehicle, even without receiving information from the merging vehicle F. Therefore, even when the merging vehicle does not have a wireless communication device, the convoy travel apparatus 1 can avoid hindering the merging of the merging vehicle at a merge point.

Further, by controlling only one vehicle to change lanes for the reserving of a merge space, energy is saved in comparison to accelerating/decelerating multiple vehicles in order to reserve the same merge space. More practically, changing lanes requires less energy than accelerating/decelerating in order to create a merge space of the same size. Further, even when the merging vehicle has not merged, the control of only one vehicle to change lanes for the merge space does not substantially waste energy, since only one vehicle, among many vehicles in the convoy, is controlled, which is a minimum number of vehicles. As a result, the deterioration to vehicle ride comfort is reduced to a minimum.

Furthermore, according to the configuration of the modification example 4, the vehicle that has been expelled from the convoy by the joining of the merging vehicle F may be able to return to the same convoy. That is, acceleration/deceleration is only required for the one vehicle that returns to the convoy. Therefore, the amount of energy that is wasted in order to return to the convoy is reduced to a minimum (i.e., a minimum number of vehicles are accelerated/decelerated).

Further, as described in the modification examples 1 to 3, even when the system/apparatus is configured to control plural vehicles in the convoy to change lanes, each of the lane-changing vehicles in the convoy can change lanes by simply performing the process in a flowchart in FIG. 5.

According to the configuration of the modification examples 1 to 3, by controlling only a part of the in-convoy vehicles to change lanes for the reserving of a merge space, energy is saved in comparison to accelerating/decelerating the same number of vehicles to reserve the same merge space. As a result, wasted energy is reduced to a minimum as a convoy, and the deterioration of vehicle ride comfort is reduced to a minimum.

Further, the modification examples 1 and 2, in which plural in-series vehicles are configured to change lanes, may be further modified that, in case that the merging vehicle F beside the lane-changed vehicle has not joined the convoy, the lane-changed vehicle may be configured not to return to the original lane (i.e., a modification example 5). More practically, the first convoy nonparticipation time process in step S275 may maintain the normal follow travel control of the self vehicle to follow the preceding vehicle when the pre-lane-change preceding vehicle remains as the preceding vehicle of the self vehicle in the same lane after the lane change. Whether the pre-lane-change preceding vehicle remains as the preceding vehicle of the self vehicle in the same lane after the lane change may be determined by the convoy travel apparatus 1 based on (i) information about the travel lane transmitted from the pre-lane-change preceding vehicle and (ii) the travel lane of the self vehicle.

Figure 14A:
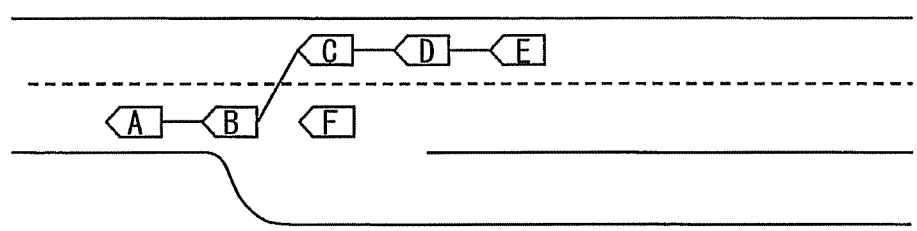
FIGS. 14A and 14B are illustrations of a series of convoy state transitions in a fifth modification in the first embodiment.
Figure 14B:
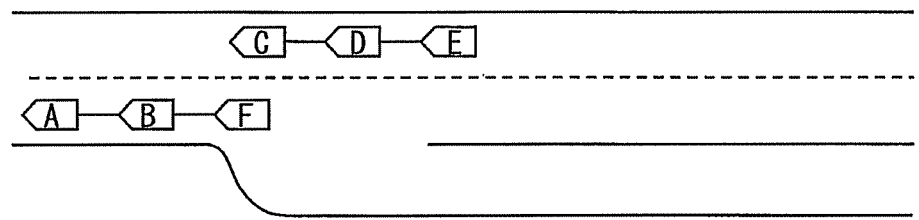

Now, with reference to FIG. 14A and FIG. 14B, a transition of convoy states in the configuration of the modification example 5, in which the merging vehicle F has joined the convoy. The transition of convoy states is described as a merging of the merging vehicle F into the convoy at a position beside the vehicle C after the lane change of the vehicles C, D, E. First, at a time of a merging of the merging vehicle F (see FIG. 14A), the first disconnection process is performed by the convoy travel apparatus 1 in the vehicle C that is positioned beside the merging vehicle F, which separates the vehicle C from the convoy. At such time, the vehicles D, E respectively maintain the follow travel control to follow the vehicles C, D traveling in the same lane. Thus, a new convoy is formed by the vehicles C, D, E (see FIG. 14B).

Further, through the convoy travel apparatus 1 in each of the vehicles in the convoy is configured to perform the process in step S21 to step S23 in the above-described embodiment, such configuration may be modified. That is, for example, after performing the process in steps S21 to S23 only in a specific vehicle (e.g., the leader vehicle) of the convoy for determining the vehicles that change lanes, the vehicle(s) determined to be changing lanes may be notified about such lane change request directly or indirectly through the vehicle-to-vehicle communication from the specific vehicle.

(Second Embodiment)

Figure 15:
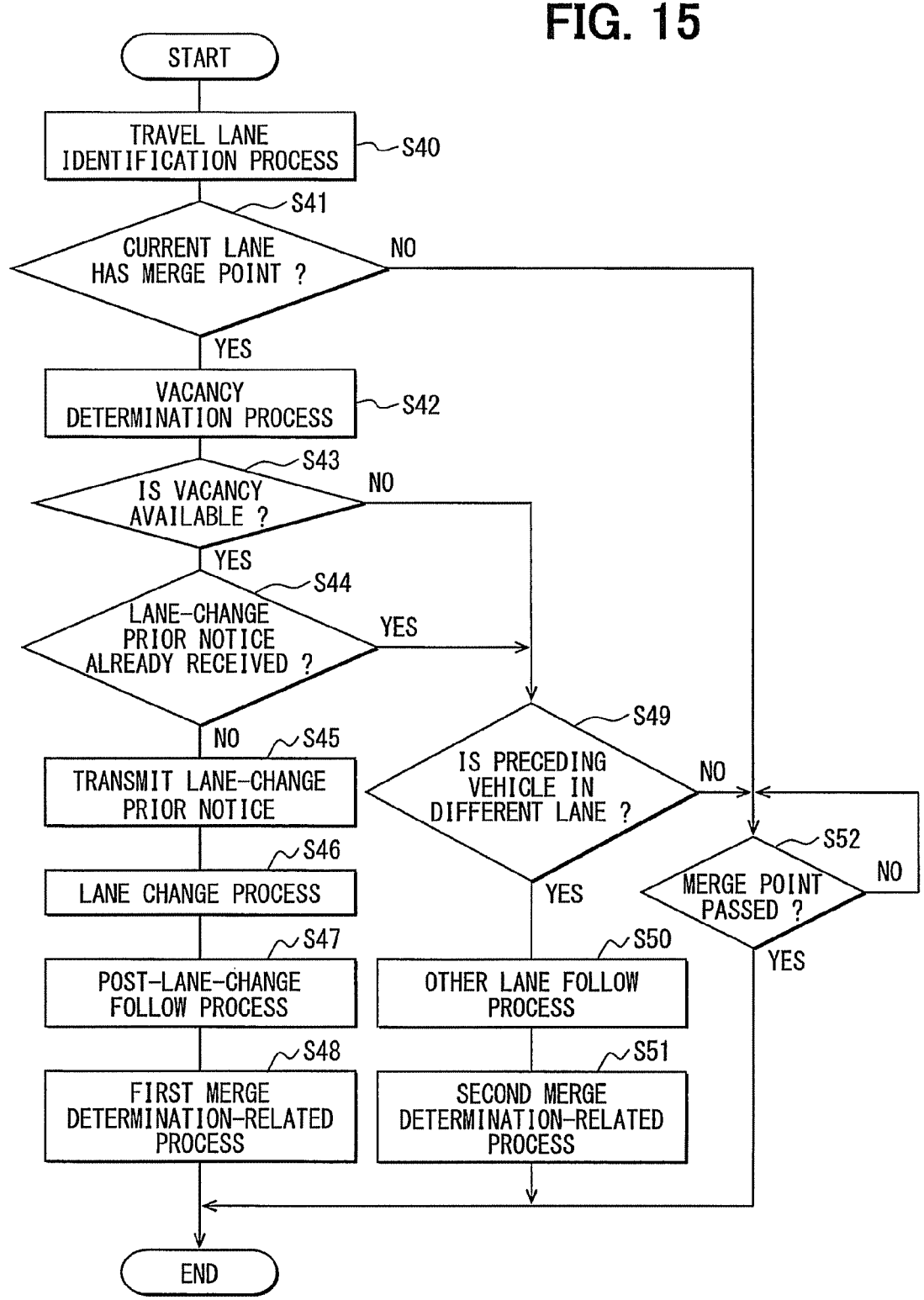
FIG. 15 is a flowchart of a merge point approach time process by the convoy travel apparatus in a second embodiment.

The present disclosure is not limited to the first embodiment, but may include the second embodiment. The second embodiment is described with reference to a flowchart in FIG. 15. Like parts have like numbers in the first and second embodiments, and the explanation of like parts will not be repeated. The convoy travel apparatus 1 of the second embodiment is similar to the convoy travel apparatus 1 of the first embodiment except for the merge point approach time process.

The wireless communication device 2 of the second embodiment is capable of performing a uni-cast method of communication with another vehicle, which exchanges information/data with another vehicle through bi-directional, one-to-one communication channel, besides performing the broadcast method communication.

The flowchart in FIG. 16 describes how a merge point approach time process is performed by the convoy travel apparatus 1 in the second embodiment. The merge point approach time control process in the second embodiment is partially identical with the same process in the first embodiment. Therefore, the same part in the process is omitted from the following description.

First, in step S40, the process performs a travel lane identification process similar to the one in step S20, and proceeds to step S41. Therefore, step S40 is also equivalent to a "travel lane identification unit" in the claims.

In step S41, the process determines whether the currently traveling lane of the self vehicle is the mergee lane that has the merge point, in the same manner as the above-described step S21. When it is determined that the travel lane of the self convoy is the mergee lane (step S41. YES), the process proceeds to step S42.

On the other hand, when it is determined that the currently traveling lane of the self convoy is not the mergee lane (step S41. NO), the process proceeds to step S52.

In step S42, the process performs a vacancy determination process, and proceeds to step S43. The vacancy determination process determines whether each of all in-convoy vehicles has a vacant space in a no-merge lane, which is on an opposite side relative to the merging lane. The vacant space is more practically defined as a space on an adjacent (no-merge) lane extending from a diagonal-front of the each vehicle toward a side of each vehicle, into which each vehicle can move by changing lanes. Therefore, the process in step S42 is also equivalent to a "vacancy determination unit" in the claims.

The vacancy determination process may determine, for example, that the vacancy is available based on a detection result of the radar 3, which detects whether any vehicle exists at a diagonal-right front or a diagonal-left front of the self vehicle or the following vehicle. The detection result from the following vehicle regarding a diagonal-right front vehicle or a diagonal-left front vehicle may be received as the vehicle information that is transmitted through vehicle-to-vehicle communication from the following vehicle.

Further, when the radar 3 in each vehicle can detect a lateral vehicle, that is, a vehicle on a right side within a certain range of the self vehicle or a vehicle on a left side within a certain range of the self vehicle, the above-described determination of vacancy may be performed based on the detection result about the lateral vehicle.

When it is determined in step S43 by the vacancy determination process that a vacancy is available (step S43, YES), the process proceeds to step S44. On the other hand, when it is determined by the vacancy determination process that no vacancy is available (step S43, NO), the process proceeds to step S49.

In step S44, the process determines whether a lane change prior notice is received either from the preceding vehicle of the self vehicle or from the following vehicle of the self vehicle through vehicle-to-vehicle communication. If such notice has already been received (step S44, YES), the process proceeds to step S49. On the other hand, when such notice has not yet been received (step S44, NO), the process proceeds to step S45. Details of the lane change prior notice will be described later.

In step S45, the process transmits the lane change prior notice to the preceding/following vehicle through vehicle-to-vehicle communication. The lane change prior notice is a notice that notifies a receiving vehicle of a scheduled lane change of the self vehicle. Therefore, the process in step S45 is equivalent to a "notification unit" in the claims.

Further, the lane change prior notice may be transmitted only from a specific apparatus 1 in an in-convoy vehicle that fulfills a certain condition. That is, the notice may only be transmitted from a vehicle other than the leader vehicle (i.e., front-most vehicle) or the tail vehicle (i.e., a rear-most vehicle) in the convoy. In addition, the notice may only be transmitted from a vehicle that is in a latter half order of the convoy.

The lane change prior notice may be transmitted to the preceding/following vehicle as a part of the vehicle information, or may be transmitted to those vehicles separately from the vehicle information through vehicle-to-vehicle communication by a uni-cast method.

The process in steps S46 to S52 is substantially same as the process in the above-described steps S25 to S31. Therefore, the lane change process in step S46 is also equivalent to a "lane change unit" in the claims.

According to the above configuration in the second embodiment, only a part of the in-convoy vehicles change lanes to the no-merge lane that is opposite to the merging lane at an approach time toward the merge point. Therefore, the same advantageous effects as the first embodiment are achieved.

Although the present disclosure has been fully described in connection with the above embodiment thereof with reference to the accompanying drawings, it is to be noted that various changes and modifications will become apparent to those skilled in the art, and such changes and modifications are to be understood as being within the scope of the present disclosure as defined by the appended claims.

What is claimed is:

1. A convoy travel system for organizing a convoy having a plurality of vehicles that are each respectively equipped with a convoy travel apparatus, the convoy travel apparatus comprising:
  a follow travel controller that controls at least one vehicle of the plurality of vehicles to respectively follow a preceding vehicle by using information obtained from the preceding vehicle through communication, the follow travel controller of the convoy travel system:
    identifying a travel lane of the convoy;

determining whether the convoy is approaching a merge point of a multi-lane road that has multiple travel lanes on a side of traffic, the multiple travel lanes including a merging lane and a non-merge lane;

determining a vehicle position ranking of the at least one vehicle by using information obtained through communication from other in-convoy vehicles in the convoy; and instructing an Electronic Power Steering Electronic Control Unit (EPS ECU) to perform steering control of the at least one vehicle to change lanes without changing its speed, wherein when the follow travel controller (i) determines that the convoy approaches the merge point and (ii) identifies that the travel lane of the convoy is the merging lane that has the merge point, the follow travel controller controls the at least one vehicle in the convoy to change lanes without changing its speed toward the non-merge lane that is adjacent the merging lane, and leaving all remaining vehicles in the convoy to continue travelling in the travel lane without changing their speeds in an unchanged state, and when the follow travel controller (iii) determines that the convoy approaches the merge point, and (iv) identifies that the travel lane of the convoy is the merging lane that has the merge point, the at least one vehicle having a subsequent vehicle from the plurality of vehicles travelling behind the at least one vehicle, the follow travel controller controls the subsequent vehicle to the at least one vehicle having the determined vehicle position ranking to change lanes without changing its speed toward the non-merge lane that is adjacent the merging lane while maintaining an inter-vehicle distance and position between the at least one vehicle and the subsequent vehicle during and after changing lanes.

2. The convoy travel system of claim 1, wherein when follow travel controller (i) determines that the convoy approaches the merge point and (ii) identifies that the travel lane of the convoy is the merging lane that has the merge point, the follow travel controller controls only one vehicle in the convoy to change lanes toward the non-merge lane that is adjacent the merging lane.

3. The convoy travel system of claim 2, wherein the follow travel controller determines a vehicle position ranking of the at least one vehicle in the convoy by using information obtained through communication from other in-convoy vehicles in the convoy, wherein when the follow travel controller (i) determines that the convoy approaches the merge point, (ii) identifies that the travel lane of the convoy is the merging lane that has the merge point, and (iii) identifies that the vehicle position ranking of the at least one vehicle in the convoy is a predetermined position ranking, the follow travel controller controls the at least one vehicle to change lanes toward the non-merge lane that is adjacent the merging lane.

4. The convoy travel system of claim 3, wherein the predetermined position ranking in the convoy is any position ranking other than a front-most position ranking of the convoy or a rear-most position ranking of the convoy.

5. The convoy travel system of claim 3, wherein the predetermined position ranking in the convoy is any position ranking other than a front-most position ranking of the convoy or a rear-most position ranking of the convoy, and the predetermined position ranking in the convoy is any position ranking that is subsequent to a middle position ranking of the convoy.

6. The convoy travel system of claim 1, wherein the follow travel controller determines a vehicle position ranking of the at least one vehicle in the convoy by using information obtained through communication from other in-convoy vehicles in the convoy, wherein when the follow travel controller (i) determines that the convoy approaches the merge point, (ii) identifies that the travel lane of the convoy is the merging lane that has the merge point, and (iii) identifies that the vehicle position ranking of the at least one vehicle in the convoy corresponds to one of predetermined plural position rankings, the follow travel controller controls the at least one vehicle to change lanes toward the non-merge lane that is adjacent the merging lane.

7. The convoy travel system of claim 1, wherein the follow travel controller determines whether a vacant space exists in the non-merge lane that is adjacent the merging lane and in an area that extends from a diagonal-front of the at least one vehicle to a side of the at least one vehicle, and notifies, as a lane change prior notice, a scheduled lane change of the at least one vehicle to other vehicles through communication when the follow travel controller (i) determines that the convoy approaches the merge point, (ii) identifies that the travel lane of the convoy is the merging lane that has the merge point, and (iii) determines that the vacancy space exists, and wherein, before providing the lane change prior notice to other vehicles, the follow travel controller determines whether the lane change prior notice has already been received by the at least one vehicle either from the preceding vehicle of the at least one vehicle or from a following vehicle of the at least one vehicle through communication, and wherein the follow travel controller of the at least one vehicle provides the lane change prior notice and controls the at least one vehicle to change lanes to the non-merge lane that is adjacent the merging lane only when the follow travel controller determines that the lane change prior notice has not already been received by the at least one vehicle either from the preceding vehicle of the at least one vehicle or from the following vehicle of the at least one vehicle through communication.

8. The convoy travel system of claim 1, wherein the follow travel controller determines whether a vacant space exists in the non-merge lane that is adjacent the merging lane and in an area that extends from a diagonal-front of the at least one vehicle to a side of the at least one vehicle, wherein the follow travel controller will not control the at least one vehicle to change lanes when the vacancy determiner determines that the vacant space does not exist.

9. The convoy travel system of claim 1, wherein the follow travel controller performs a first other lane follow travel control when, after the lane change of the at least one vehicle to a lane that is adjacent the merging lane by the follow travel controller, the at least one vehicle travels in a different lane from a pre-lane-change preceding vehicle, or the follow travel controller continues to perform a follow travel control of the at least one vehicle to follow the pre-lane-change preceding vehicle when, after the follow travel controller of the at least one vehicle to the non-merge lane that is adjacent the merging lane by the follow travel controller, the pre-lane-change preceding vehicle travels in a same lane as the at least one vehicle.

10. The convoy travel system of claim 9, wherein
the follow travel controller determines whether a merging vehicle has merged in a side space on a merging point side of the at least one vehicle after the lane change of the at least one vehicle, wherein the follow travel controller automatically performs a steering control of the at least one vehicle to control the at least one vehicle to change lanes to a lane that was previously traveled before the lane change of the at least one vehicle when the follow travel controller determines that no vehicle has merged.

11. The convoy travel system of claim 10, wherein
the follow travel controller of the convoy travel apparatus ends the follow travel control when the follow travel controller determines that a vehicle has merged and the merged vehicle has joined the convoy.

12. The convoy travel system of claim 9, wherein
the follow travel controller performs a second other-lane follow travel control that controls the at least one vehicle to follow a preceding vehicle in a different lane when the preceding vehicle of the at least one vehicle travels in a different lane from the at least one vehicle even though the follow travel controller has not controlled the at least one vehicle to change lanes.

13. The convoy travel system of claim 1, wherein
the follow travel controller determines whether a merging vehicle has merged into a side space on a merging point side of the at least one vehicle after the lane change of the at least one vehicle, and automatically performs an acceleration/deceleration control and a steering control for the at least one vehicle to move the at least one vehicle either in front of a leader vehicle of the convoy or behind a tail vehicle of the convoy when (i) the follow travel controller has determined that a vehicle has merged and (ii) the merged vehicle has joined the convoy.

14. A convoy travel apparatus for controlling a plurality of vehicles in a convoy of vehicles to follow a preceding vehicle by using information obtained from the preceding vehicle through communication, the convoy travel apparatus comprising:

a microcomputer programmed to:
identify a travel lane of the convoy;
determine whether the convoy is approaching a merge point of a multi-lane road that has multiple travel lanes on a side of traffic, the multiple lanes including a merging lane and a non-merge lane;
determine a vehicle position ranking of at least one vehicle of the plurality of vehicles by using information obtained through communication from other in-convoy vehicles in the convoy; and
instruct an Electronic Power Steering Electronic Control Unit (EPS ECU) of the at least one vehicle of the plurality of vehicles to perform a steering control of the at least one vehicle to change lanes without changing its speed, wherein
when the microcomputer (i) determines that the convoy approaches the merge point and (ii) identifies that the travel lane of the convoy is the merging lane that has the merge point, the microcomputer controls the at least one vehicle to change lanes without changing its speed toward the non-merge lane that is adjacent the merging lane, and leaves all remaining vehicles in the convoy to continue travelling in the travel lane without changing their speeds in an unchanged state, and when the microcomputer (i) determines that the convoy approaches the merge point, and (ii) identifies that the travel lane of the convoy is the merging lane that has the merge point, the at least one vehicle having a subsequent vehicle from the plurality of vehicles travelling behind the at least one vehicle, the microcomputer controls the subsequent vehicle to the at least one vehicle having the determined vehicle position ranking to change lanes without changing its speed toward the non-merge lane that is adjacent the merging lane while maintaining an inter-vehicle distance and position between the at least one vehicle and the subsequent vehicle during and after changing lanes.

15. A convoy travel system for organizing a convoy having a plurality of vehicles that are each respectively equipped with a convoy travel apparatus, the convoy travel apparatus comprising:

a follow travel controller that controls at least one vehicle of the plurality of vehicles to respectively follow a preceding vehicle by using information obtained from the preceding vehicle through communication, the follow travel controller of the convoy travel system:
identifying a travel lane of the convoy;
determining whether the convoy is approaching a merge point of a multi-lane road that has multiple travel lanes on a side of traffic, the multiple travel lanes including a merging lane and a non-merge lane; and
instructing an Electronic Power Steering Electronic Control Unit (EPS ECU) to perform steering control of the at least one vehicle to change lanes without changing its speed, wherein
when the follow travel controller (i) determines that the convoy approaches the merge point and (ii) identifies that the travel lane of the convoy is the merging lane that has the merge point, the follow travel controller controls the at least one vehicle in the convoy to change lanes without changing its speed toward the non-merge lane that is adjacent the merging lane, and leaving all remaining vehicles in the convoy to continue travelling in the travel lane in an unchanged state, wherein the follow travel controller determines whether a vacant space exists in the non-merge lane that is adjacent the merging lane and in an area that extends from a diagonal-front of the at least one vehicle to a side of the at least one vehicle, and notifies, as a lane change prior notice, a scheduled lane change of the at least one vehicle to other vehicles through communication when the follow travel controller (i) determines that the convoy approaches the merge point, (ii) identifies that the travel lane of the convoy is the merging lane that has the merge point, and (iii) determines that the vacancy space exists, and wherein, before providing the lane change prior notice to other vehicles, the follow travel controller determines whether the lane change prior notice has already been received by the at least one vehicle either from the preceding vehicle of the at least one vehicle or from a following vehicle of the at least one vehicle through communication, and wherein the follow travel controller of the at least one vehicle provides the lane change prior notice and controls the at least one vehicle to change lanes without changing its speed to the non-merge lane that is adjacent the merging lane only when the follow travel controller determines that the lane change prior notice has not already been received by the at least one vehicle either from the preceding vehicle of the at least one vehicle or from the following vehicle of the at least one vehicle through communication.

16. A convoy travel apparatus for controlling a plurality of vehicles in a convoy of vehicles to follow a preceding vehicle by using information obtained from the preceding vehicle through communication, the convoy travel apparatus comprising:
a microcomputer programmed to:
identify a travel lane of the convoy;
determine whether the convoy is approaching a merge point of a multi-lane road that has multiple travel lanes on a side of traffic, the multiple lanes including a merging lane and a non-merge lane; and
instruct an Electronic Power Steering Electronic Control Unit (EPS ECU) of at least one vehicle of the plurality of vehicles to perform a steering control of the at least one vehicle to change lanes without changing its speed, wherein
when the microcomputer (i) determines that the convoy approaches the merge point and (ii) identifies that the travel lane of the convoy is the merging lane that has the merge point, the microcomputer controls the at least one vehicle to change lanes without changing its speed toward the non-merge lane that is adjacent the merging lane, and leaves all remaining vehicles in the convoy to continue travelling in the travel lane in an unchanged state,
and wherein the microcomputer determines whether a vacant space exists in the non-merge lane that is adjacent the merging lane and in an area that extends from a diagonal-front of the at least one vehicle to a side of the at least one vehicle, and notifies, as a lane change prior notice, a scheduled lane change of the at least one vehicle to other vehicles through communication when the microcomputer (i) determines that the convoy approaches the merge point, (ii) identifies that the travel lane of the convoy is the merging lane that has the merge point, and (iii) determines that the vacancy space exists, and
wherein, before providing the lane change prior notice to other vehicles, the microcomputer determines whether the lane change prior notice has already been received by the at least one vehicle either from the preceding vehicle of the at least one vehicle or from a following vehicle of the at least one vehicle through communication,
and wherein the microcomputer of the at least one vehicle provides the lane change prior notice and controls the at least one vehicle to change lanes without changing its speed to the non-merge lane that is adjacent the merging lane only when the microcomputer determines that the lane change prior notice has not already been received by the at least one vehicle either from the preceding vehicle of the at least one vehicle or from the following vehicle of the at least one vehicle through communication.

17. The convoy travel system of claim 1, wherein the follow travel controller determines the inter-vehicle distance between the at least one vehicle and the subsequent vehicle after changing lanes by calculating an initial inter-vehicle distance based on position coordinates corresponding to a position of the at least one vehicle and a position of the subsequent vehicle and calculating the inter-vehicle distance by correcting the initial inter-vehicle distance based on an error due to an offset of the position of the at least one vehicle and the position of the subsequent vehicle in a vehicle width direction.

18. The convoy travel apparatus of claim 14, wherein the microcomputer determines the inter-vehicle distance between the at least one vehicle and the subsequent vehicle after changing lanes by calculating an initial inter-vehicle distance based on position coordinates corresponding to a position of the at least one vehicle and a position of the subsequent vehicle and calculating the inter-vehicle distance by correcting the initial inter-vehicle distance based on an error due to an offset of the position of the at least one vehicle and the position of the subsequent vehicle in a vehicle width direction.

* * * * *